(12) United States Patent
Tsuchida et al.

(10) Patent No.: US 7,599,910 B1
(45) Date of Patent: Oct. 6, 2009

(54) METHOD AND SYSTEM OF DATABASE DIVISIONAL MANAGEMENT FOR PARALLEL DATABASE SYSTEM

(75) Inventors: Masashi Tsuchida, Sagamihara (JP); Kazuo Masai, Yokohama (JP); Shunichi Torii, Musashino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/665,448

(22) Filed: Sep. 19, 2000

Related U.S. Application Data

(60) Continuation of application No. 09/429,398, filed on Oct. 28, 1999, now Pat. No. 6,192,359, which is a continuation of application No. 09/153,612, filed on Sep. 15, 1998, now Pat. No. 6,101,495, which is a division of application No. 08/341,953, filed on Nov. 16, 1994, now Pat. No. 5,813,005.

(30) Foreign Application Priority Data

Nov. 16, 1993 (JP) .................................. 5-286549

(51) Int. Cl.
*G06F 17/30* (2006.01)
(52) U.S. Cl. ............................................. 707/3; 6/205
(58) Field of Classification Search ................. 707/4, 707/2, 10, 101, 6, 204
See application file for complete search history.

(56) References Cited

U.S. PATENT DOCUMENTS

| | | | |
|---|---|---|---|
| 4,344,134 A | 8/1982 | Barnes | 364/200 |
| 5,283,731 A | 2/1994 | Lalonde et al. | 364/401 |
| 5,283,897 A | 2/1994 | Georgiadis et al. | 395/650 |
| 5,423,037 A | 6/1995 | Hvasshovd | 707/202 |
| 5,485,607 A | 1/1996 | Lomet et al. | 707/8 |
| 5,504,894 A | 4/1996 | Furguson et al. | 395/650 |
| 5,515,531 A * | 5/1996 | Fujiwara et al. | 707/3 |

(Continued)

FOREIGN PATENT DOCUMENTS

JP 63318628 12/1988

(Continued)

OTHER PUBLICATIONS

Wolf et al, "A Hybrid Data Sharing-Data Partitioning Architecture for Transaction Processing" IEEE, pp. 520-527.

(Continued)

*Primary Examiner*—Jean M Corrielus
(74) *Attorney, Agent, or Firm*—Brundidge & Stanger, P.C.

(57) ABSTRACT

A method and a system of database divisional management for use with a parallel database system comprising an FES (front end server), BES's (back end servers), an IOS (I/O server) and disk units. The numbers of processors assigned to the FES, BES's and IOS, the number of disk units, and the number of partitions of the disk units are determined in accordance with the load pattern in question. Illustratively, there may be established a configuration of one FES, four BES's, one IOS and eight disk units. The number of BES's is varied from one to four depending on the fluctuation in load, so that a scalable system configuration is implemented. When the number of BES's is increased or decreased, only the management information thereabout is transferred between nodes and not the data, whereby the desired degree of parallelism is obtained for high-speed query processing.

3 Claims, 23 Drawing Sheets

U.S. PATENT DOCUMENTS

| | | | | |
|---|---|---|---|---|
| 5,524,257 | A | 6/1996 | Koike et al. | 395/800 |
| 5,544,313 | A | 8/1996 | Shachnai et al. | 395/200.01 |
| 5,548,761 | A | 8/1996 | Balasundaram et al. | 395/700 |
| 5,551,027 | A | 8/1996 | Choy et al. | 395/600 |
| 5,555,404 | A | 9/1996 | Torbjørnsen | 707/202 |
| 5,625,815 | A | 4/1997 | Maier et al. | 707/8 |
| 5,813,005 | A * | 9/1998 | Tsuchida et al. | 707/10 |
| 5,822,780 | A | 10/1998 | Schutzman | 711/165 |
| 6,101,495 | A * | 8/2000 | Tsuchida et al. | 707/10 |
| 6,192,359 | B1 * | 2/2001 | Tsuchida et al. | 707/4 |
| 6,510,428 | B2 * | 1/2003 | Tsuchida et al. | 707/6 |
| 6,801,921 | B2 * | 10/2004 | Tsuchida et al. | 707/204 |
| 6,829,623 | B2 * | 12/2004 | Tsuchida et al. | 707/204 |
| 7,321,907 | B2 * | 1/2008 | Tsuchida et al. | 707/204 |

FOREIGN PATENT DOCUMENTS

| | | |
|---|---|---|
| JP | 02028877 | 1/1990 |
| JP | 02247748 | 10/1990 |
| JP | 05036343 | 2/1993 |
| JP | 6314299 | 4/1993 |
| JP | 05261085 | 10/1993 |
| JP | 05265954 | 10/1993 |

OTHER PUBLICATIONS

David et al, "Parallel Database Systems: The Future of High Performance Database Systems" ACM, vol. 35, No. 6, p. 85 (14).

Osman et al, "A Load Balancing Aproach for Parallel Database Machines", IEEE, Nov. 1995, pp. 51-58.

Yu et al, Dynamic Transaction Routing in Distributed Database Systems, IEEE, Nov. 1988, pp. 1307-1318.

Oracle 8TM Server SQL Reference, Release 8.0, Jun. 1997, pp. 4-139 to 4-142 and 4-148 to 4-153.

Lu, et al, "Dynamic and Load-balanced Task-Oriented Database Query Processing in Parallel Systems", Department of Information Systems and Computer Science National University of Singapore, Mar. 1992, pp. 356-373.

Nikkei Electronics, Jul. 19, 1993, pp. 104-105 (Eng. Translation attached of most relevant portion).

T. Asano et al, An Architecture of a High Speed Database Machine: HDM, Information systems and Electronics Development Lab., of Mitsubishi Electric Corporation, Sep. 19, 1989 (89-ARC-78), pp. 1-8.

D. Dewitt, "Query Execution in Direct", National Science Fundation, Mar. 1979.

Hachem et al "Back End Architecture based on Transformed Inverted Lists, A Surrogate File Structure for a Very Large Data/Knowledge Base" IEEE, pp. 10-19.

Parashar et al, "On Partitioning Dynamic Adaptive Grip Hierarchies" IEEE, pp. 604-613.

Pande et al "Compiling Functional Parallelism on Distributed-Memory Systems", IEEE, pp. 64-76.

Hua et al, "Dynamic Load Balancing in Multicomputer Database Systems using Partion Tuning" IEEE, pp. 968-983.

K. A. Hus, et al "Data Partitioning for Multicomputer Database Systems: A Cell-Based Approach", Information Systems, vol. 18, No. 5, pp. 329-542, Jul. 1993.

* cited by examiner

METHOD AND SYSTEM OF DATABASE DIVISIONAL MANAGEMENT FOR PARALLEL DATABASE SYSTEM

This is a continuation of application Ser. No. 09/429,398, filed Oct. 28, 1999 now U.S. Pat. No. 6,192,359; which is a continuation of Ser. No. 09/153,612, filed Sep. 15, 1998, now U.S. Pat. No. 6,101,495; which is a divisional of application Ser. No. 08/341,953, filed Nov. 16, 1994 now U.S. Pat. No. 5,813,005.

BACKGROUND OF THE INVENTION

1. Field of the Invention

The present invention relates to a method and a system of database divisional management for use with a parallel database system. More particularly, the invention relates to a database divisional management method and a parallel database system whereby the number of processors or the number of disk units for database processing is optimized under given loads.

2. Description of the Prior Art

Parallel database systems are proposed illustratively by David Dewitt and Jim Gray in "Parallel Database Systems The Future of High Performance Database Systems" (CACM, Vol. 35, No. 6, 1992, pp. 85-98). Parallel database systems of the kind proposed above involve having a plurality of processors tightly or loosely connected to one another and subjected to database divisional management.

How to configure a conventional parallel database system is at the user's discretion. Once established, the conventional system configuration must remain as it is. With its lack of flexibility, the system configuration may be unsuitable from the start for dealing with envisaged loads or may become incapable of addressing the loads some time after the start of its operative state. In such cases, the desired degree of parallel processing is not available and/or high-speed query processing is not implemented.

SUMMARY OF THE INVENTION

It is an object of the present invention to provide a database divisional management method and a parallel database system whereby desired degrees of parallel processing and high-speed query processing are available.

In carrying out the invention and according to a first aspect thereof, there is provided a database divisional management system for use with a parallel database system having a storage medium, storage and management means for storing and managing a database in the storage medium, and a plurality of access means for accessing the database in response to query inputs. This database divisional management system comprises: generation means for generating a procedure for processing the query inputs; division means for dividing the database into a plurality of partitions in accordance with the load pattern provided for executing the generated processing procedure; and determination means for determining the number of access means for simultaneously accessing the partitions of the database.

In a preferred structure according to the invention, the storage and management means determines the physical addresses corresponding to logical addresses at which the plurality of access means access the partitions of the database.

With this structure, the load pattern is determined by the access efficiency of each of the access means and by the amount of information stored in the partitions of the database accessed by the access means.

According to a second aspect of the invention, there is provided a database divisional management method for use with a parallel database system comprising an FES node for analyzing and optimizing user queries and generating a processing procedure in response thereto, BES nodes for accessing a database on the basis of the processing procedure generated by the FES node, an IOS node having a storage medium (i.e., disk units) and capable of storing and managing the database in the storage medium, and a network for connecting the FES, BES and IOS nodes. This database divisional management method comprises the steps of: calculating the load pattern by which to perform database processing using the processing procedure; and determining the number of processors assigned to the FES node, the number of processors assigned to the BES nodes, the number of processors assigned to the IOS node, the number of disk units of the IOS node, and the number of partitions of the disk units in accordance with the load pattern for data processing.

According to a third aspect of the invention, there is provided a database divisional management method for use with a parallel database system comprising an FES node for analyzing and optimizing user queries and generating a processing procedure in response thereto, BES nodes having a storage medium (i.e., disk units) in which to store a database and capable of accessing the database on the basis of the processing procedure generated by the FES node, and a network for connecting the FES and BES nodes. This database divisional management method comprises the steps of: calculating the load pattern by which to perform database processing using the processing procedure; and determining the number of processors assigned to the FES node, the number of processors assigned to the BES nodes, the number of disk units of the BES nodes, and the number of partitions of the disk units in accordance with the load pattern for database processing.

According to a fourth aspect of the invention, there is provided a database divisional management method for use with a parallel database system comprising an FES node for analyzing and optimizing user queries and generating a processing procedure in response thereto, BES nodes for accessing a database on the basis of the processing procedure generated by the FES node, an IOS node having a storage medium (i.e., disk units) and capable of storing and managing the database in the storage medium, and a network for connecting the FES, BES and IOS nodes. This database divisional management method comprises the steps of: determining the upper limit number of pages which are accessible in parallel and which require a constant time each when the database is scanned for access thereto; and determining the number of processors assigned to the FES node, the number of processors assigned to the BES nodes, the number of processors assigned to the IOS node, the number of disk units of the IOS node, and the number of partitions of the disk units in accordance with the upper limit number of pages.

According to a fifth aspect of the invention, there is provided a database divisional management method for use with a parallel database system comprising an FES node for analyzing and optimizing user queries and generating a processing procedure in response thereto, BES nodes having a storage medium (i.e., disk units) in which to store and manage a database and capable of accessing the database on the basis of the processing procedure generated by the FES node, and a network for connecting the FES and BES nodes. This database divisional management method comprises the steps of: determining the upper limit number of pages which are accessible in parallel and which require a constant time each when the database is scanned for access thereto; and determining the number of processors assigned to the FES node, the number of processors assigned to the BES nodes, the number of disk units of the BES nodes, and the number of partitions of the disk units in accordance with the upper limit number of pages.

According to a sixth aspect of the invention, there is provided a database divisional management method for use with a parallel database system comprising an FES node for analyzing and optimizing user queries and generating a processing procedure in response thereto, BES nodes for accessing a database on the basis of the processing procedure generated by the FES node, an IOS node having a storage medium (i.e., disk units) and capable of storing and managing the database in the storage medium, and a network for connecting the FES, BES and IOS nodes. This database divisional management method comprises the steps of: calculating the expected degree of parallelism p according to the load pattern based on the processing procedure; and determining the number of processors assigned to the FES node, the number of processors assigned to the BES nodes, the number of processors assigned to the IOS node, the number of disk units of the IOS node, and the number of partitions of the disk units in accordance with the expected degree of parallelism p.

According to a seventh aspect of the invention, there is provided a database divisional management method for use with a parallel database system comprising an FES node for analyzing and optimizing user queries and generating a processing procedure in response thereto, BES nodes having a storage medium (i.e., disk units) in which to store and manage a database and capable of accessing the database on the basis of the processing procedure generated by the FES node, and a network for connecting the FES and BES nodes. This database divisional management method comprises the steps of: calculating the expected degree of parallelism p according to the load pattern based on the processing procedure; and determining the number of processors assigned to the FES node, the number of processors assigned to the BES nodes, the number of disk units of the BES nodes, and the number of partitions of the disk units in accordance with the expected degree of parallelism p.

In another preferred structure according to the invention, the database divisional management method further comprises the steps of: calculating the optimum number of accessible pages m; calculating the number of pages s (=m/p) in units of sub-key ranges if key range partitions exist; and having sub-key range partitions in units of s pages for inserting data into a disk apparatus.

According to an eighth aspect of the invention, there is provided a database divisional management method for use with a parallel database system comprising an FES node for analyzing and optimizing user queries and generating a processing procedure in response thereto, BES nodes for accessing a database on the basis of the processing procedure generated by the FES node, an IOS node having a storage medium (i.e., disk units) and capable of storing and managing the database in the storage medium, and a network for connecting the FES, BES and IOS nodes. This database divisional management method comprises the steps of: detecting a load unbalance on the basis of such load information items as the number of accessed pages, the number of hit rows and the number of communications acquired during execution of the processing procedure; and changing the number of processors assigned to the FES node, the number of processors assigned to the BES nodes, the number of processors assigned to the IOS node, and the number of disk units of the IOS node so as to eliminate the load unbalance.

According to a ninth aspect of the invention, there is provided a database divisional management method for use with a parallel database system comprising an FES node for analyzing and optimizing user queries and generating a processing procedure in response thereto, BES nodes having a storage medium (i.e., disk units) in which to store and manage a database and capable of accessing the database on the basis of the processing procedure generated by the FES node, and a network for connecting the FES and BES nodes. The database divisional management method comprises the steps of: detecting a load unbalance on the basis of such load information items as the number of accessed pages, the number of hit rows and the number of communications acquired during execution of the processing procedure; and changing the number of processors assigned to the FES node, the number of processors assigned to the BES nodes, and the number of disk units of the BES nodes so as to eliminate the load unbalance.

In a further preferred structure according to the invention, the database divisional management method further comprises the steps of: closing, when online processing is in progress, the key range of a database table if at least one of the three numbers consisting of the number of processors assigned to the BES nodes, the number of processors assigned to the IOS node and the number of disk units is to be increased, the database table being the object to be managed by either the processors or the disk units to be added; assigning the processors and the disk units anew; succeeding lock information and directory information; updating the dictionary information necessary for node assignment control; and releasing the closing of the key range thereafter if the online processing is still in progress.

In an even further preferred structure according to the invention, the database divisional management method further comprises the steps of: closing, when online processing is in progress, the key range of a database table if either the number of processors assigned to the BES nodes or the number of disk units is to be increased, the database table being the object to be managed by either the processors or the disk units to be added; assigning either the processors or the disk units anew; succeeding lock information and directory information; updating the dictionary information necessary for node assignment control; moving data from the existing group of disk units to the newly added disk units; and releasing the closing of the key range thereafter if the online processing is still in progress.

In a still further preferred structure according to the invention, the database divisional management method comprises the steps of: closing, when online processing is in progress, the key range of a database table if at least one of the three numbers consisting of the number of processors assigned to the BES nodes, the number of processors assigned to the IOS node and the number of disk units is to be decreased, the database table being managed by either the processors or the disk units to be removed; determining either the processors or the disk units to be removed; succeeding lock information and directory information; updating the dictionary information necessary for node assignment control; and releasing the closing of the key range thereafter if the online processing is still in progress.

In another preferred structure according to the invention, the database divisional management method further comprises the steps of: closing, when online processing is in progress, the key range of a database table if at least either the number of processors assigned to the BES nodes or the number of disk units is to be decreased, the database table being managed by either the processors or the disk units to be removed; determining either the processors or the disk units to be removed; succeeding lock information and directory information; updating the dictionary information necessary for node assignment control; moving data from the disk units to be removed to the disk units succeeding those units to be removed; and releasing the closing of the key range thereafter if the online processing is still in progress.

In a further preferred structure according to the invention, either the number of processors or the number of disk units for database processing is changed dynamically.

In operation, the invention of the aspects and preferred structures outlined above provides the following major functions and features:

The database divisional management method according to the second aspect of the invention determines the number of processors assigned to each of the configured nodes, the number of disk units, and the number of partitions of the disk units in accordance with the load pattern for database processing (single item search, single item update, data retrieval, etc.). The invention embodied in this structure provides a system configuration suitable for dealing with the load in question, offers the expected degree of parallelism and permits high-speed query processing.

The database divisional management method according to the fourth aspect of the invention determines the number of processors assigned to each of the configured nodes, the number of disk units, and the number of partitions of the disk units in accordance with the upper limit number of pages which are accessible in parallel and which require a constant time each when the database is scanned for access thereto. The invention embodied in this structure realizes high-speed query processing.

The database divisional management method according to the sixth aspect of the invention determines the number of processors assigned to each of the configured nodes, the number of disk units, and the number of partitions of the disk units in accordance with the expected degree of parallelism p according to the load pattern. The invention embodied in this structure provides the expected degree of parallelism.

The database divisional management method of a preferred structure calculates the number of pages s in units of sub-key ranges using the optimum number of accessible pages m and the expected degree of parallelism p (s=m/p), and gets sub-key range partitions in units of s pages for inserting data into a disk apparatus. The invention embodied in this alternative structure allows data to be managed in substantially equal partitions.

The database divisional management method according to the eighth aspect of the invention detects a load unbalance, and changes the number of processors assigned to each of the configured nodes or the number of disk units so as to eliminate the detected load unbalance. The invention embodied in this structure keeps the system always configured to allow for the load fluctuation, provides the expected degree of parallelism and permits high-speed query processing.

When online processing is in progress, the database divisional management method of another alternative structure closes the key range of the relevant database table if either the number of processors assigned to each of the configured nodes or the number of disk units is to be increased or decreased. After this, necessary information is succeeded and the closing of the key range is released. This structure minimizes the overhead and, in a system configuration comprising the IOS node, allows the data to be succeeded without moving them across the disk units.

The database divisional management method of yet another preferred structure allows either the number of processors or the number of disk units for database processing to be changed dynamically. This feature readily provides for a scalable parallel database system.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Preferred embodiments of the invention will now be described with reference to the accompanying drawings. It should be noted that such description is for illustrative purposes only and is not limitative of the invention.

Figure 1:
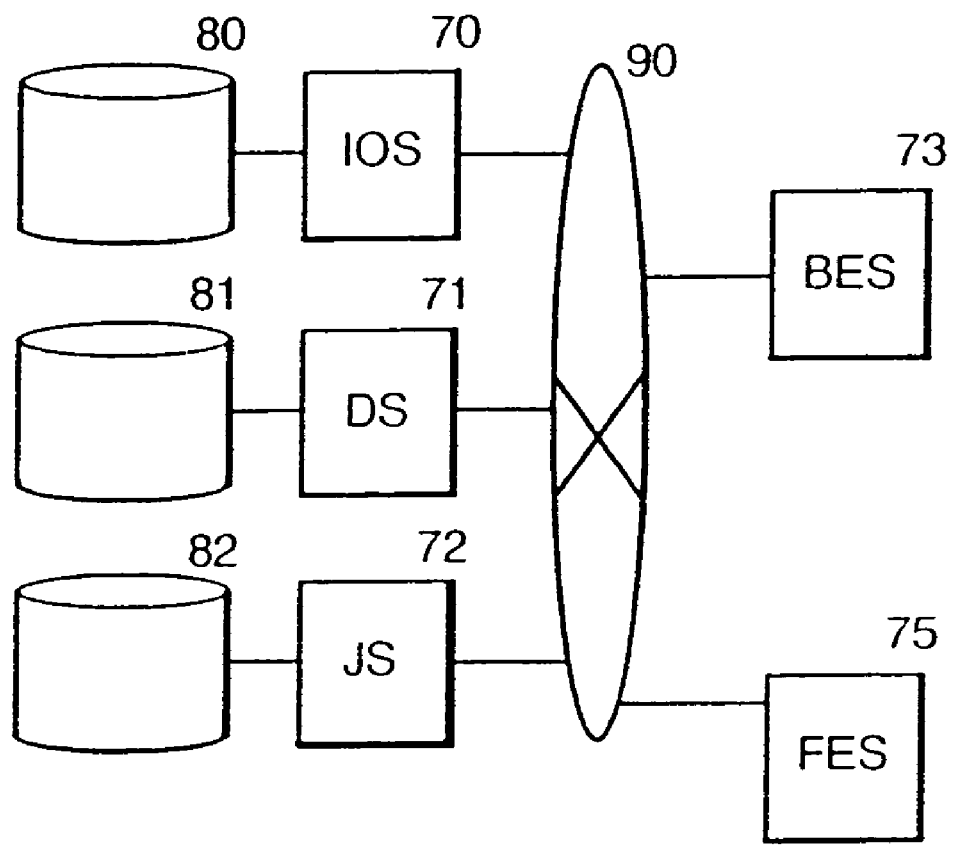
FIG. 1 is a block diagram of a parallel database system embodying the invention.

FIG. 1 is a block diagram of a parallel database system 1 embodying the invention. The parallel database system 1 comprises an FES (front end server) node, a BES (back end server) node, an IOS (input/output server) node, a DS (dictionary server) node and a JS (journal server) node, all connected by a network 90. Each of the configured nodes is also connected to another system.

The FES node 75 is composed of at least one processor having no disk units. This node has front end server functions for analyzing and optimizing user queries and for generating a processing procedure in response thereto.

The BES node 73 comprises at least one processor with no disk units. This node is capable of accessing a database by use of the processing procedure generated by the FES 75.

The IOS node 70 includes at least one processor and is equipped with at least one disk unit 80. The disk unit 80 accommodates the database so that the latter may be managed therein.

If the BES node 73 is supplemented by the functions of the IOS nodes, the IOS node may be omitted. In such a case, the disk unit 80 is connected to the BES node 73 which now has functions for storing and managing the database in the connected disk unit 80.

The database is composed of a plurality of tables. Each table is a two-dimensional table comprising a plurality of rows. One row includes at least one column (i.e., attribute). These tables, stored in the disk unit 80, are each divided physically into fixed-length pages made of a predetermined number of rows each. The location at which each of the pages is stored in the disk unit 80 is known by referencing directory information.

The DS node 71 comprises at least one processor and has at least one disk unit 81. This node is capable of managing database definition information as a whole.

The JS node 72 includes at least one processor and has at least one disk unit 82. This node has functions for storing and managing the history information on database updates carried out by each node.

Figure 2:
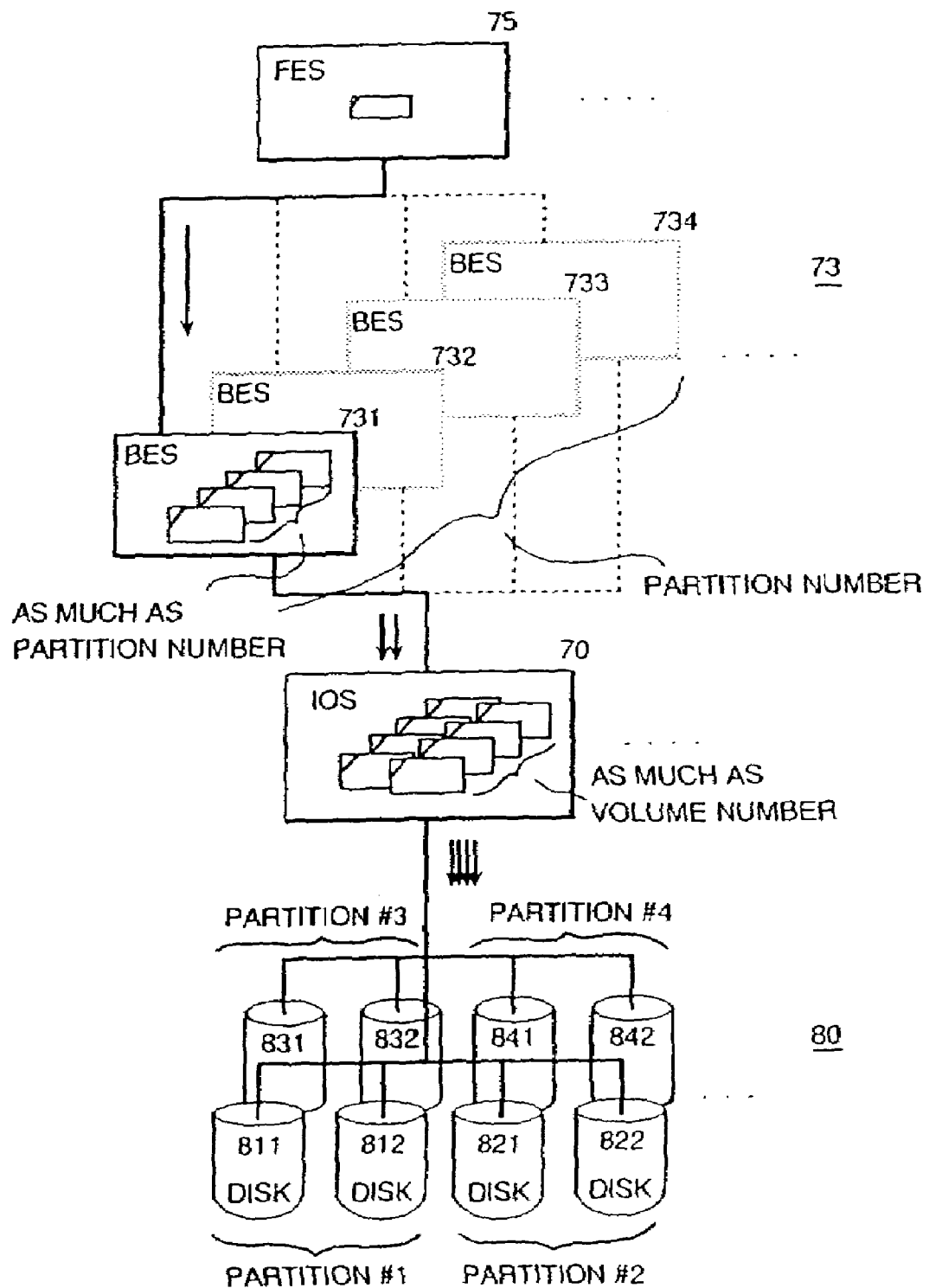
FIG. 2 is a conceptual view of a database divisional management method embodying the invention.

FIG. 2 is a conceptual view of a database divisional management method embodying the invention. This method determines the number of processors assigned to each of the FES node 75, BES node 73 and IOS node 70 in FIG. 1, the number of configured disk units, and the number of partitions of the disk units.

First to be determined is the load pattern of database processing on the basis of the use-designated work load. The load pattern is any one of a diverse kinds of processing including single item search, single item update and data retrieval. With the load pattern established, the IOS node 70 determines accordingly the number of partitions of the disk units 80 for management. (If the BES node 73 incorporates IOS node functions, the BES node 73 determines the number of partitions of the disk units for management.)

Specifically, at the time of schema definition, the number of necessary disk units is determined by the way the database tables are partitioned (in terms of key range, number of rows per range converted from the number of pages, etc.). When the unit in which the key range is closed or reconfigured is determined, the combination of BES and IOS units 73 and 70 is determined (the unit in which to close or reconfigure the key range is dependent on the configuration made of disk units and of IOS and BES nodes).

In the manner described, the configuration of the BES and IOS units 73 and 70 and of the disk units 80 is determined as follows:

Partition count: unit number of database partitions that may be accessed in parallel under management of all BES nodes Disk count per partition: number of disk units assigned to each partition FIG. 2 shows an example in which the disk count is 8, the partition count is 4 and the disk count per partition is 2.

If the processor performance is enhanced by a factor of n, then the number of volumes for use by each partition is multiplied by n. (It should be noted that the number of disk units is limited because of the constraints on the overall data transfer rate between the IOS node 70 and the disk units 80.)

Although one disk unit represents one disk drive in the above example, the one-to-one correspondence between a disk drive and a disk unit is not mandatory for this invention. One disk unit may illustratively contain a plurality of disk drives (e.g., disk array apparatus). In that case, the unit number of I/O units that may be accessed in parallel may be regarded as a disk unit.

In the example of FIG. 2 where the normal configuration is composed of one FES node, four BES nodes, one IOS node and eight disk units, there need only be one FES node and one BES node at initial data load time. That is, the initial configuration is made of one FES node, one BES node, one IOS node and eight disk units. Thus a BES node 731 has directory information about the database stored in disk units 811-842 constituting partitions #1-#4.

Where the BES load is so low that one BES node 731 is enough to deal with the IOS 70 and eight disk units 811-842, the single BES node 731 alone accesses the database stored in the eight disk units 811-842. In that case, the configuration remains composed of one FES node, one BES node, one IOS node and eight disk units.

If the load on the BES node 731 is on the increase and its activity ratio stays at 100%, a load unbalance may eventually be detected. In that case, another BES node 732 is added to the configuration. Since the partition count is 4, the two BES nodes 731 and 732 are assigned two partitions each. The BES node 731 thus has directory information about the database stored in the disk units 811-822 constituting partitions #1-#2; the BES node 732 has directory information about the database stored in the disk units 831-842 constituting partitions #3-#4. The resulting configuration is composed of one FES node, two BES nodes, one IOS node and eight disk units.

If the load on the BES nodes 731 and 732 is still on the increase and their activity ratio stays at 100%, a load unbalance may also be detected. In that case, the BES nodes 731 and 732 are supplemented respectively by BES nodes 733 and 734. Since the partition count is 4, the four BES nodes 731, 732, 733 and 734 are assigned one partition each. The BES node 731 thus has directory information about the database stored in the disk units 811-812 constituting partition #1; the BES node 732 has directory information about the database stored in the disk units 821-822 constituting partition #2; the BES node 733 has directory information about the database stored in the disk units 831-832 constituting partition #3; and the BES node 734 has directory information about the database stored in the disk units 841-842 constituting partition #4. The resulting configuration is composed of one FES node, four BES nodes, one IOS node and eight disk units.

When the load is on the decrease and the activity ratio of the BES nodes 733 and 734 drops illustratively below the 50% benchmark and remains there, it then becomes more efficient for the BES nodes 733 and 734 to be assigned to other tasks. The BES nodes 733 and 734 whose activity ratio is below 50% are thus reconfigured. The reduced configuration comprises one FES node, two BES nodes, one IOS node and eight disk units.

As described, where the number of BES nodes is increased or reduced depending on the amount of load, a scalable system is implemented within a range defined by two scales of configuration: one FES node, one BES node, one IOS node and eight disk units on the one hand; and one FES node, four BES nodes, one IOS node and eight disk units on the other.

The IOS node 70 need only address parallel tasks as many as parallelly accessible disk units regardless of the correspondence between the BES nodes 73 and the disk units 80. This makes it possible to change the correspondence between the BES nodes 73 and the disk units 80 by moving the directory information across the BES nodes without recourse to data movement. Separating and integrating accesses is thus made easier.

Below is a description of how two representative load patterns of single item update and data retrieval are processed. The processing is described in terms of the number of steps involved, the number of processors, the number of disk units and the number of partitions of the disk units. The preconditions for the processing are assumed as follows:

FES processing (data reception): 30 (K steps)
BES processing (single item update): 60 (K steps)
BES processing (data retrieval): 220 (K steps)
Transmission: 6 (K steps)
Reception: 6+4*page count (K steps)
Issuance of input/output request:
4+4*page count (K steps)
Processor performance: 10 (M steps per second)
Input/output performance (one-page access): 20 (msec)
Input/output performance (10-page access): 30 (msec)

A. Single Item Update (One-Page Access)

(1) With System Configuration Comprising IOS Node

Dividing the processor performance (10 M steps per second) by the FES processing step count (30 K steps) provides an available reception count of up to 333 times per second.

The necessary step count for single item update by a BES node is given as: reception of an execution request from the FES node (6 K steps)+transmission of a data retrieval request from the BES node (6 K steps)+reception of retrieved data from IOS node (10 K steps)+single item update (60 K steps)+ transmission of the result of the execution request to FES node (6 K steps)=88 (K steps). Dividing the processor performance (10 M steps per second) by the obtained single item update step count (88 K steps) for the BES node provides an available single item update count of up to 114 times per second.

In addition, the necessary step count for the IOS node to access disk units is given as: reception of an input/output request from the BES node (6 K steps)+issuance of the input/output request (8 K steps)+transmission of the result of the input/output request to the BES node (6 K steps)=20 (K steps). Dividing the processor performance (10 M steps per second) by the obtained disk access step count of 20 (K steps) for the IOS node provides an available disk access count of up to 500 times per second.

Because it takes 20 msec to perform random input/output of one page, one disk unit may be accessed up to 50 times per second. When the maximum available disk access count of 500 times per second for the IOS node is divided by the single disk access count of 50 times per second, the result indicates that up to 10 disk units may be connected to the IOS node.

When the maximum available disk access count of 500 times per second for the IOS node is divided by the single item update count of 114 times per second for the BES node, the result indicates that one IOS node may address up to 4.3 BES nodes.

When the maximum available reception count of up to 333 times per-second for the FES node is divided by the single item update count of 114 times per second for the BES node, the result indicates that one FES node may address up to three BES nodes.

Figure 3:
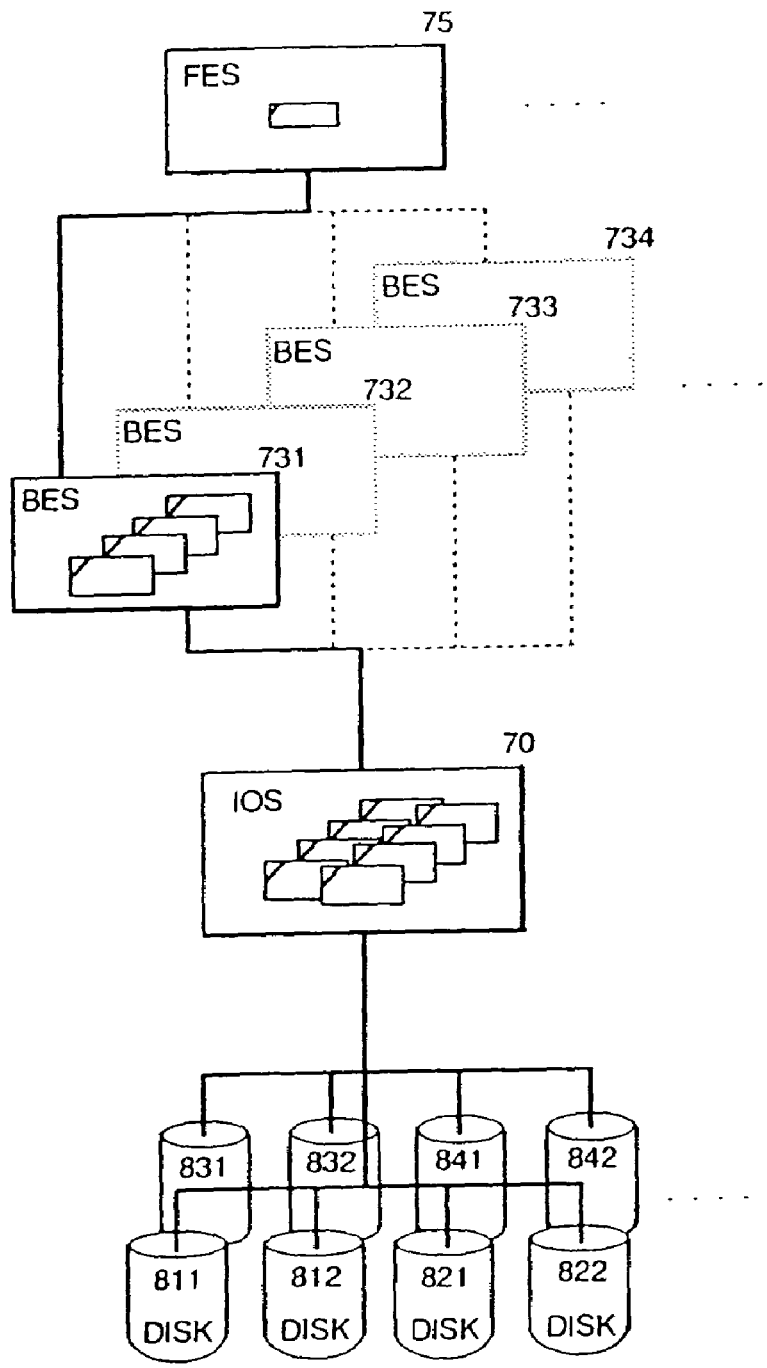
FIG. 3 is a conceptual view of optimal node distribution (where an IOS exists) by the inventive database divisional management method.

The results above are summarized into ratios of FES: BES=1:3, BES:IOS=4.3:1, and IOS:disk units=1:10. Putting these ratios together provides a substantially balanced configuration composed of one FES node, four BES nodes, one IOS node and eight disk units, as shown in FIG. 3 (with a minor imbalance regarding the FES node and the disk units).

(2) With System Configuration where BES Nodes Furnish IOS Node Functions

Dividing the processor performance (10 M steps per second) by the FES processing step count (30 K steps) provides an available reception count of up to 333 times per second.

The necessary step count for single item update by a BES node is given as: reception of an execution request from the FES node (6 K steps)+issuance of an input/output request (8 K steps)+single item update (60 K steps)+transmission of the result of the execution request to FES node (6 K steps)=80 (K steps). Dividing the processor performance (10 M steps per second) by the obtained single item update step count (80 K steps) provides an available single item update count of up to 125 times per second.

Because it takes 20 msec to perform random input/output of one page, one disk unit may be accessed up to 50 times per second. When the maximum available single item update count of 125 times per second for the BES node is divided by the single disk access count of 50 times per second, the result indicates that up to 2.5 disk units may be connected to the BES node.

When the maximum available reception count of up to 333 times per second for the FES node is divided by the single item update count of 125 times per second for the BES node, the result indicates that one FES node may address up to 2.6 BES nodes.

Figure 4:
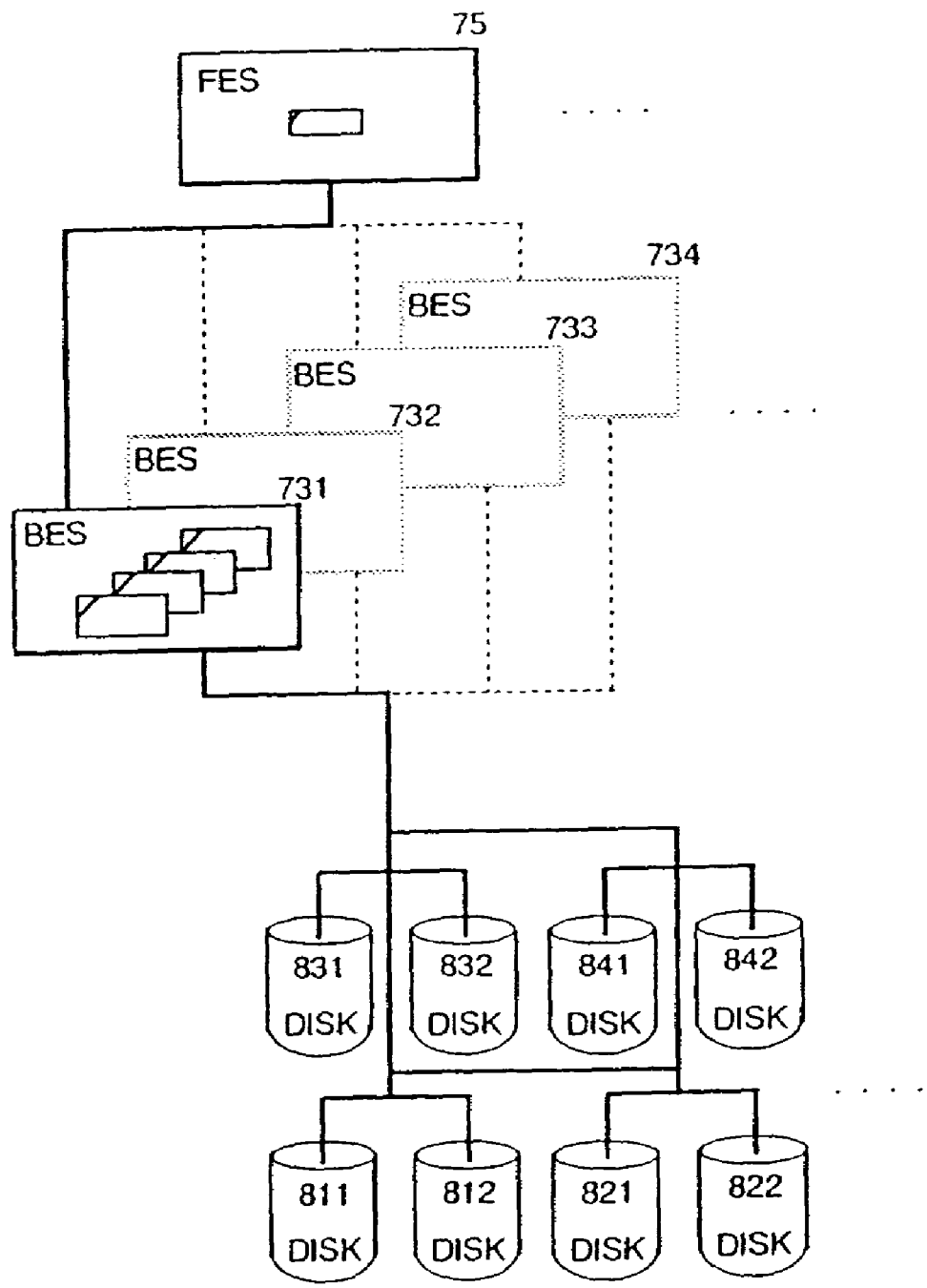
FIG. 4 is a conceptual view of optimal node distribution (where an IOS does not exist) by the inventive database divisional management method.

The results above are summarized into ratios of FES: BES=1:2.6 and BES:disk units=1:2.5. Putting these ratios together provides a substantially balanced configuration composed of one FES node, four BES nodes and eight disk units, as shown in FIG. 4 (with a minor imbalance regarding the FES node).

B. Data Retrieval (10-Page Access)

(1) With System Configuration Comprising IOS Node

Dividing the processor performance (10 M steps per second) by the FES processing step count (30 K steps) provides an available reception count of up to 333 times per second.

The necessary step count for data retrieval by a BES node is given as: reception of an execution request from the FES node (6 K steps)+transmission of a data retrieval request from the BES node (6 K steps)+reception of retrieved data from IOS node (46 K steps)+retrieval of data (220 K steps)+transmission of the result of the execution request to FES node (6 K steps)=284 (K steps). Dividing the processor performance (10 M steps per second) by the obtained data retrieval step count (284 K steps) provides an available data retrieval count of up to 35 times per second.

In addition, the necessary step count for the IOS node to access disk units is given as: reception of an input/output request from the BES node (6 K steps)+issuance of the input/output request (44 K steps)+transmission of the result of the input/output request to the BES node (6 K steps)=56 (K steps). Dividing the processor performance (10 M steps per second) by the obtained step count provides an available disk access count of up to 179 times per second.

Because it takes 30 msec to perform batch input/output of 10 pages, one disk unit may be accessed up to 33 times per second. When the maximum available disk access count of 179 times per second for the IOS node is divided by the single disk access count of 33 times per second, the result indicates that up to 5.4 disk units may be connected to the IOS node.

When the maximum available disk access count of 179 times per second for the IOS node is divided by the available data retrieval count of 35 times per second for the BES node, the result indicates that one IOS node may address up to 5.1 BES nodes.

In addition, when the maximum available reception count of 333 times per second for the FES node is divided by the available data retrieval count of 35 times per second for the BES node, the result indicates that one FES node may address up to 9.5 BES nodes.

The results above are summarized into ratios of FES: BES=1:9.5, BES:IOS=5.1:1, and IOS:disk units=1:5.4. Putting these ratios together provides a substantially balanced configuration composed of one FES node, 10 BES nodes, two IOS nodes and 10 disk units (with a minor imbalance regarding the disk units).

(2) With System Configuration where BES Nodes Furnish IOS Node Functions

Dividing the processor performance (10 M steps per second) by the FES processing step count (30 K steps) provides an available reception count of up to 333 times per second.

The necessary step count for data retrieval by a BES node is given as: reception of an execution request from the FES node (6 K steps)+issuance of an input/output request (44 K steps)+retrieval of data (220 K steps)+transmission of the result of the execution request to FES node (6 K steps)=276 (K steps). Dividing the processor performance (10 M steps per second) by the obtained data retrieval step count (276 K steps) for the BES node provides an available data retrieval count of up to 36 times per second.

Because it takes 30 msec to perform batch input/output of 10 pages, one disk unit may be accessed up to 33 times per second. When the maximum available data retrieval count of 36 times per second for the BES node is divided by the single disk access count of 33 times per second, the result indicates that one disk unit may be connected to the BES node.

When the maximum available reception count of up to 333 times per second for the FES node is divided by the available data retrieval count of 36 times per second for the BES node, the result indicates that one FES node may address up to 9.2 BES nodes.

The results above are summarized into ratios of FES: BES=1:9.2 and BES:disk unit=1:1.1 Putting these ratios together provides a substantially balanced configuration composed of one FES node, 10 BES nodes and 10 disk units.

Figure 5:
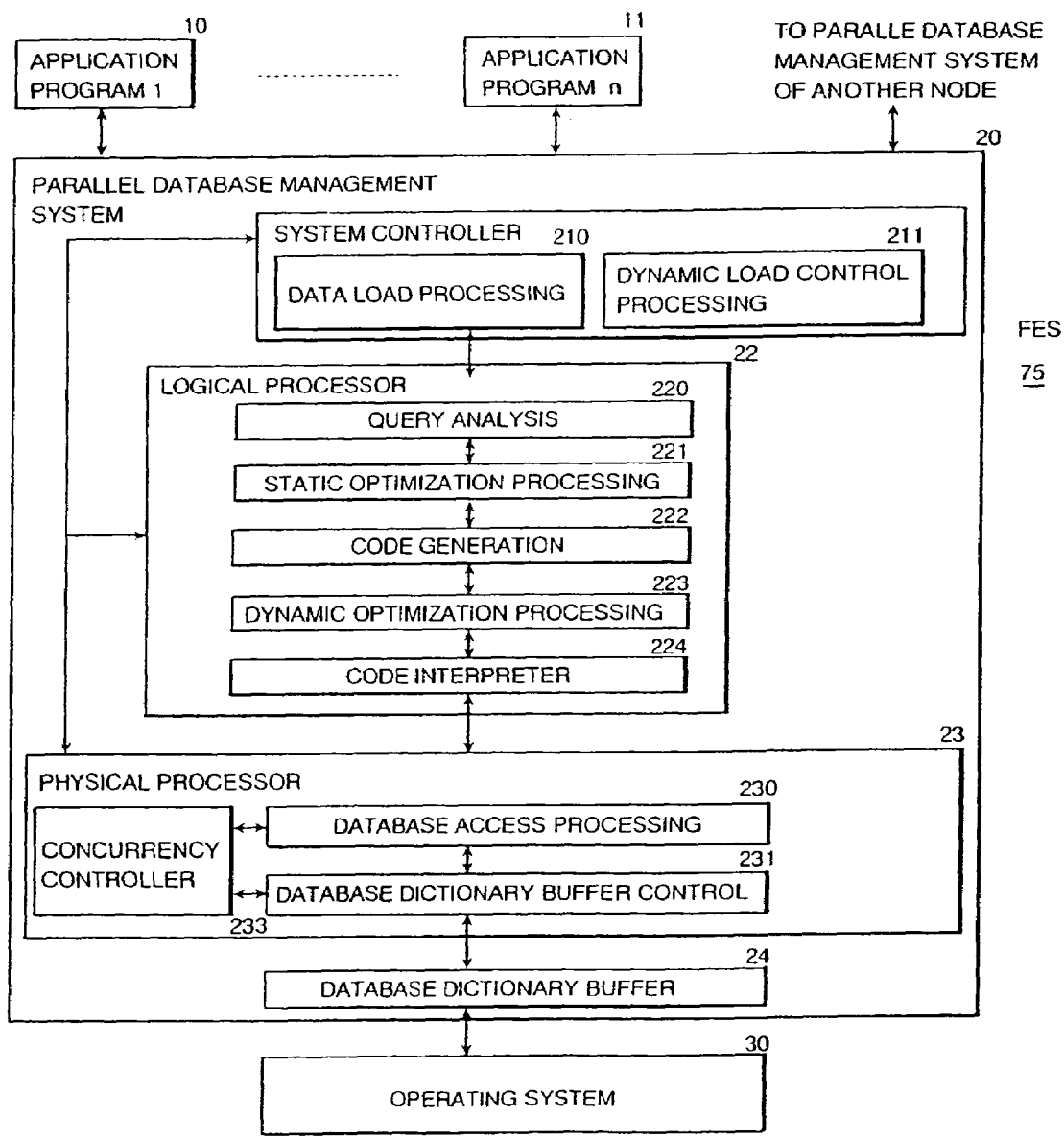
FIG. 5 is a block diagram of an FES.

FIG. 5 is a block diagram of the FES node 75. The FES node 75 comprises user-generated application programs 10-11, a parallel database management system for providing overall database system management such as query processing and resource management, and an operating system 30 for managing all computer system operations including the reading and writing of data.

The parallel database management system 20 has a system controller 21, a logical processor 22, a physical processor 23, and a database dictionary buffer 24 for temporarily accommodating target data. The parallel database management system 20 is connected to the network 90 as well as to another parallel database management system.

The system controller 21 primarily manages input/output and other operations. The system controller 21 has a data load processing program 210 and a dynamic load control processing program 211.

The logical processor 22 includes a query analysis program 220 for analyzing queries in terms of syntax and semantics, a static optimization processing program 221 for generating appropriate processing procedure candidates, and a code generator 222 for generating the code applicable to each processing procedure candidate generated. The logical processor 22 further includes a dynamic optimization processing program 223 for selecting an optimal processing procedure and a code interpreter 224 for interpreting the code of the selected processing procedure candidate.

The physical processor 23 comprises a data access processing program 230 that edits accessed data and judges them for conditions, and adds records; a database dictionary buffer controller 231 that controls the reading and writing of database records; and a concurrency controller 233 that provides concurrency control over the resources shared by the systems.

Figure 6:
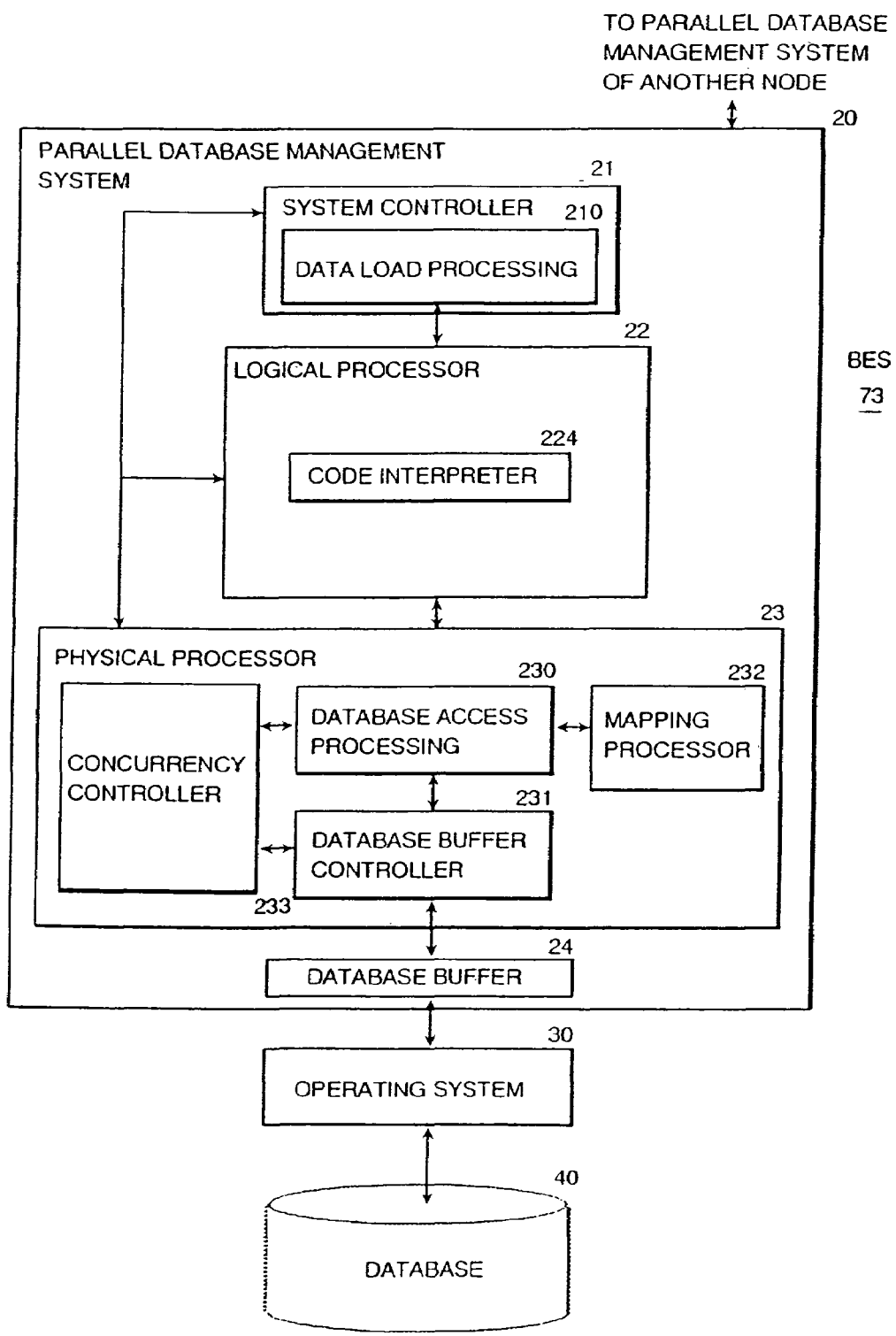
FIG. 6 is a block diagram of a BES.

FIG. 6 is a block diagram of the BES node 73. The BES node 73 is composed of the parallel database management system 20 for overall database system management and the operating system 30 for overall computer system management. Where the BES node 73 is equipped with IOS node functions, the BES node 73 has disk units in which to store and manage a database 40.

The parallel database management system 20 comprises the system controller 21, the logical processor 22, the physical processor 23, and a database buffer 24 for temporarily accommodating target data. This parallel database management system 20 is connected to the network 90 and to another parallel database management system 20.

The system controller 21 manages input/output and other operations. The system controller 21 includes the data load processing program 210 that loads data by taking load distribution into consideration.

The logical processor 22 comprises the code interpreter 224 that carries out code interpretation.

The physical processor 23 includes the data access processing program 230 that edits accessed data and judges them for conditions, and adds records; the database buffer controller 231 that controls the reading and writing of database records; a mapping processing program 232 that manages the locations at which the target data to be input or output are stored; and the concurrency controller 233 that provides concurrency control over the resources shared by the systems.

Figure 7:
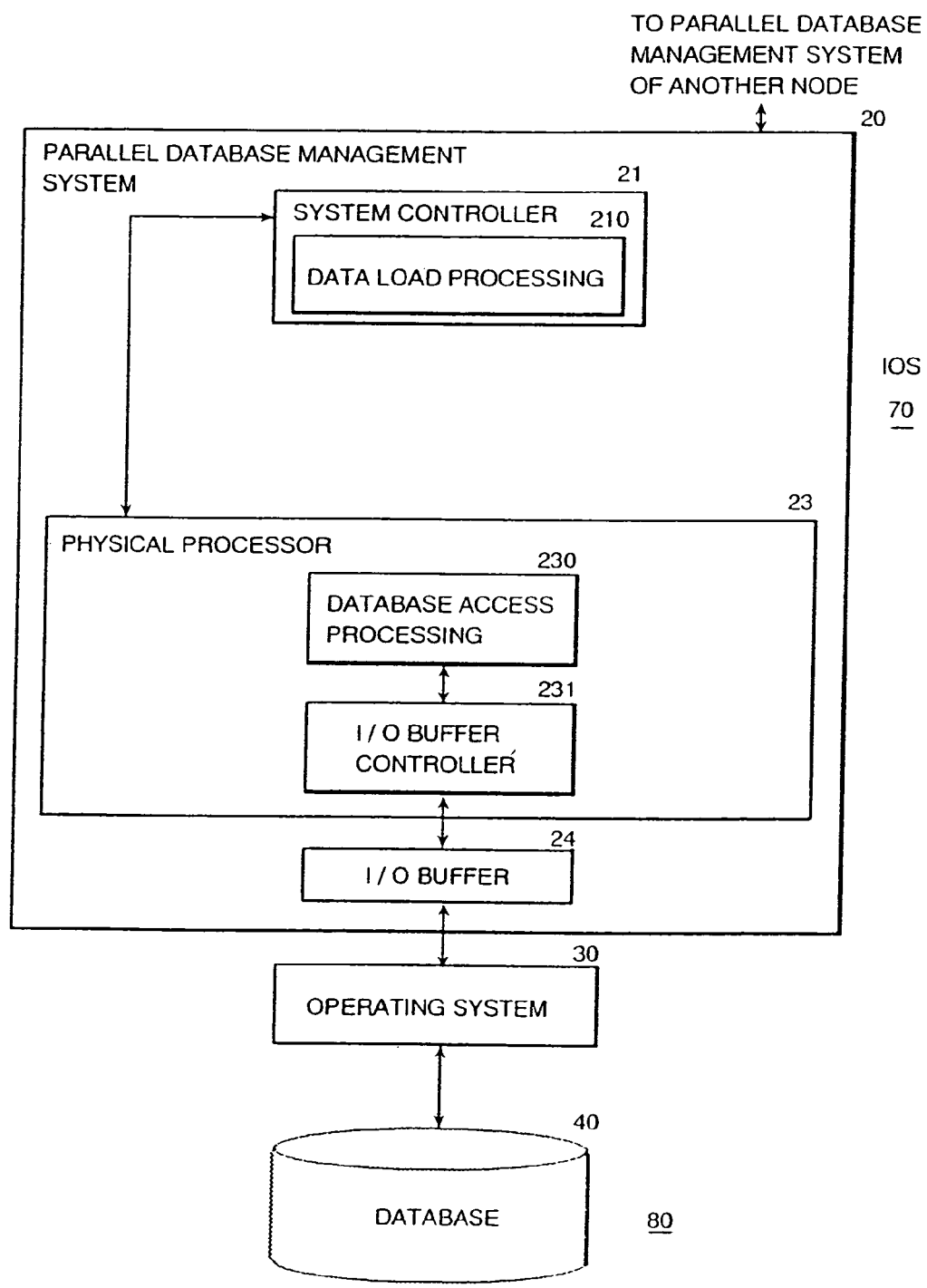
FIG. 7 is a block diagram of an IOS.

FIG. 7 is a block diagram of the IOS node 70 together with the disk unit 80. The IOS node 70 comprises the parallel database management system 20 for overall database system management and the operating system 30 for overall computer system management. The disk unit 80 contains the database 40.

The parallel database management system 20 comprises the system controller 21, the physical processor 23, and an input/output buffer 24 for temporarily accommodating target data. This parallel database management system 20 is connected to the network 90 as well as to another parallel database management system.

The system controller 21 manages input/output and other operations. The system controller 21 includes the data load processing program 210 that loads data by taking load distribution into consideration.

The physical processor 23 comprises the data access processing program 230 that edits accessed data and judges them for conditions, and adds records; and an input/output buffer controller 231 that controls the reading and writing of database records.

Figure 8:
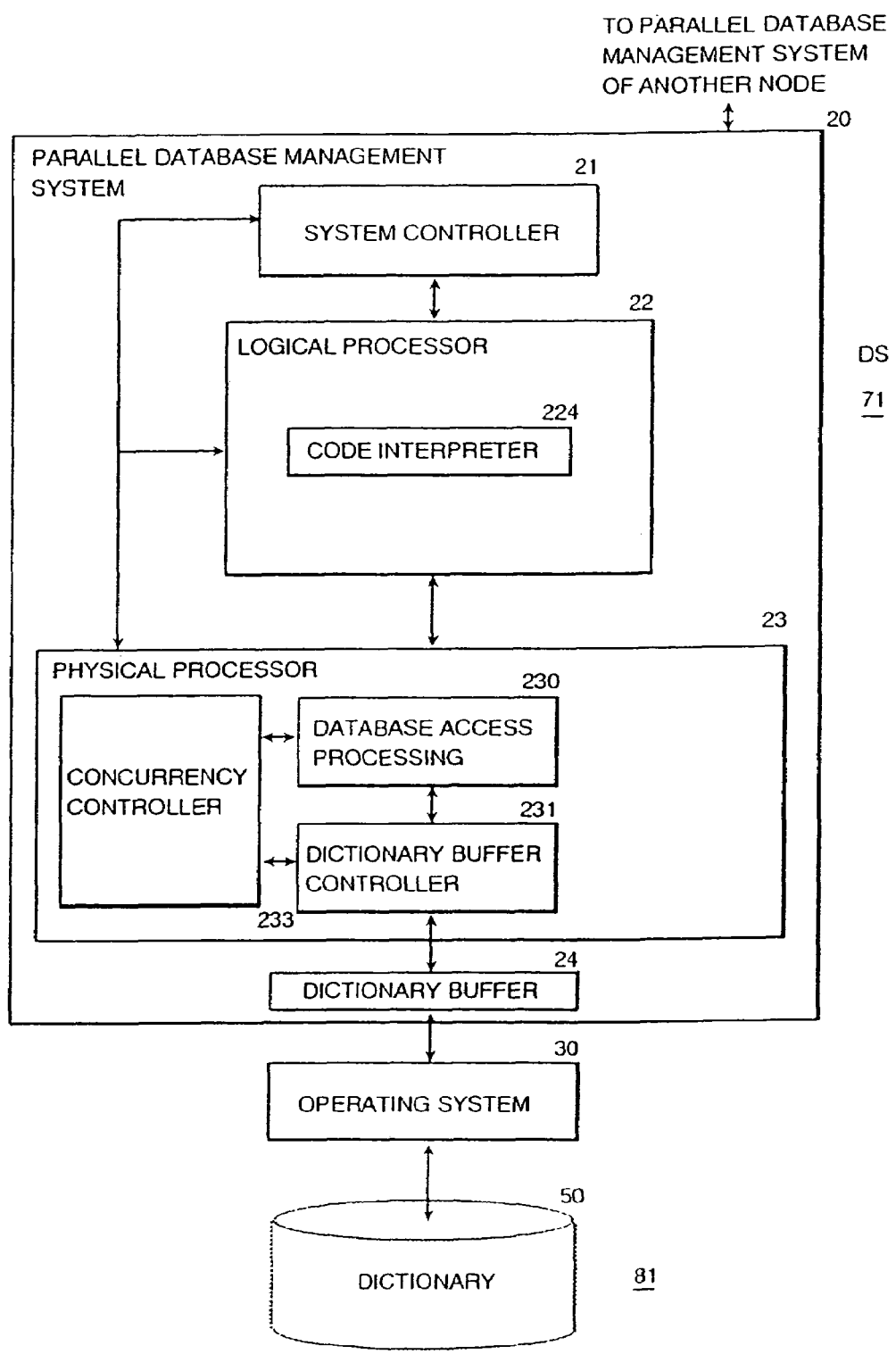
FIG. 8 is a block diagram of a DS.

FIG. 8 is a block diagram of the DS 71 together with the disk unit 81. The DS 71 comprises the parallel database management system 20 for overall database system management and the operating system 30 for overall computer system management. The disk unit 81 contains a dictionary 50.

The parallel database management system 20 comprises the system controller 21, the logical processor 22, the physical processor 23, and a dictionary buffer 24. This parallel database management system 20 is connected to the network 90 as well as to another parallel database management system.

The logical processor 22 includes the code interpreter 224 that carries out code interpretation.

The physical processor 23 includes the data access processing program 230 that edits accessed data and judges them for conditions, and adds records; the dictionary buffer controller 231 that controls the reading and writing of dictionary records; and the concurrency controller 233 that provides concurrency control over the resources shared by the systems.

Figure 9:
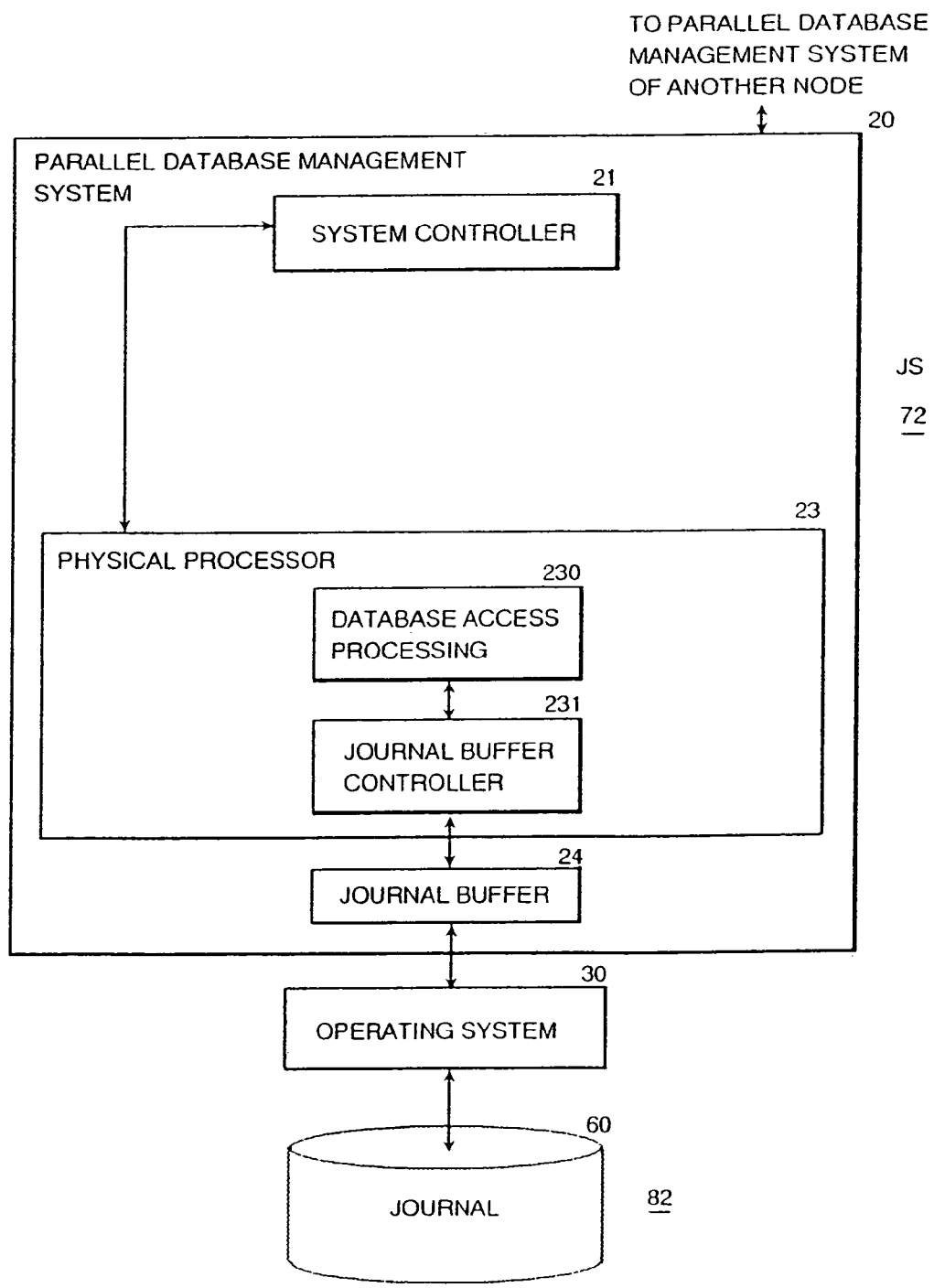
FIG. 9 is a block diagram of a JS.

FIG. 9 is a block diagram of the JS 72 together with the disk unit 82. The JS 72 comprises the parallel database management system 20 for overall database system management and the operating system 30 for overall computer system management. The disk unit 82 contains a journal 60.

The parallel database management system 20 comprises the system controller 21, the physical processor 23, and a journal buffer 24. This parallel database management system 20 is connected to the network 90 as well as to another parallel database management system.

The physical processor 23 includes the data access processing program 230 that edits accessed data and judges them for conditions, and adds records; and a journal buffer controller 231 that controls the reading and writing of journal records.

Figure 10:
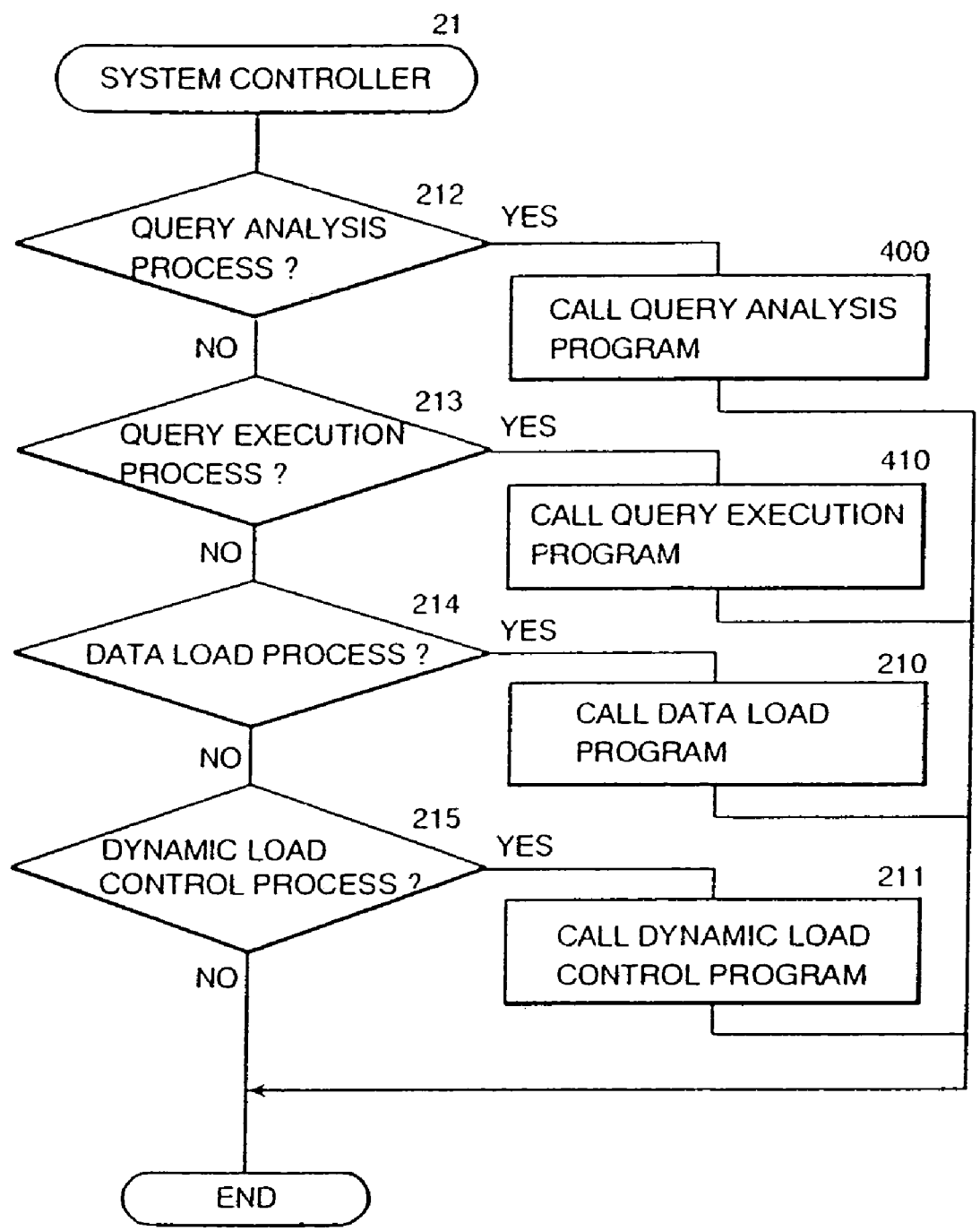
FIG. 10 is a flowchart of steps performed by a system controller.

FIG. 10 is a flowchart of steps performed by the system controller of the parallel database management system 20 in the FES node 75. The system controller 21 first checks to see if a query analysis process is selected (step 212). If the query analysis process is found to be selected, the system controller 21 calls and executes a call query analysis program 400. After execution of the call query analysis program 400, the system controller 21 ends its operation.

If the query analysis process is not in effect in step 212, the system controller 21 checks to see if a query execution process is selected (step 213). If the query execution process is found to be selected, the system controller 21 calls and executes a query execution program 410. After execution of the query execution program 410, the system controller 21 ends its operation.

If the query execution process is not in effect in step 213, the system controller 21 checks to see if a data load process is selected (step 214). If the data load process is found to be selected, the system controller 21 calls and executes a data load program 210. After execution of the data load program 210, the system controller 21 ends its operation.

If the data load process is not in effect in step 214, the system controller 21 checks to see if a dynamic load control process is selected (step 215). If the dynamic load control program is found to be selected, the system controller 21 calls and executes a dynamic load control program 211. After execution of the dynamic load control program 211, the system controller 21 end its operation.

If the dynamic load control process is not in effect in step 215, then the system controller 21 terminates its operation.

The flowchart of steps performed by the database management system 20 of the BES node 73 is that of FIG. 10 minus steps 212, 215, 400 and 211. The flowchart of steps carried out by the database management system 20 of the IOS node 70 is that of FIG. 10 minus steps 212, 213, 215, 400, 410 and 211.

Figure 11:
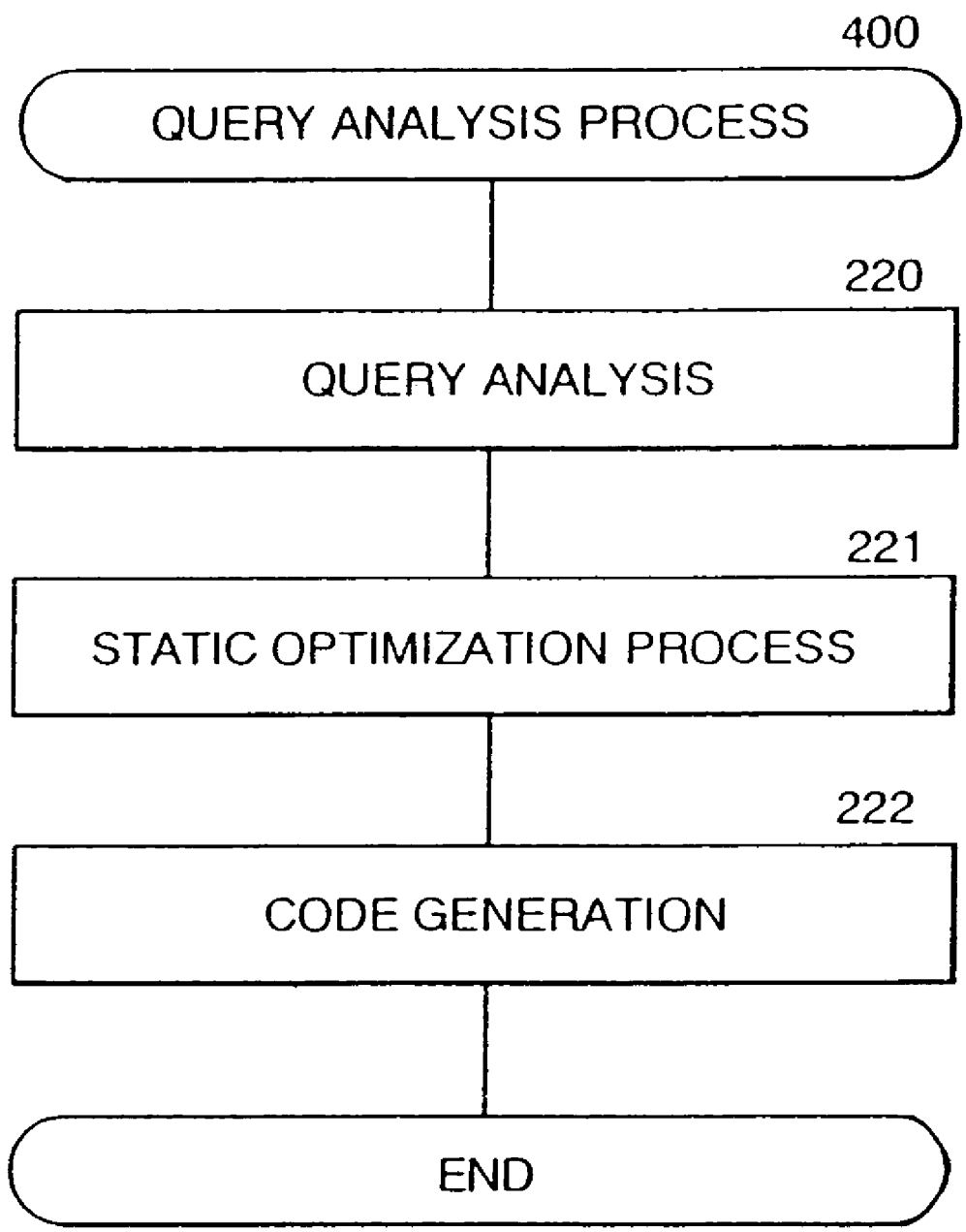
FIG. 11 is a flowchart of steps representing a query analysis process.

FIG. 11 is a flowchart of steps performed by the query analysis program 400. In step 220 for query analysis, the program 400 analyzes the input query sentence for syntax and semantics.

In step 221 for static optimization, the query analysis program 400 estimates the ratio of the data that would satisfy the condition occurring in the query. Then based on predetermined rules, the program 400 generates effective access path candidates (especially indices) so as to prepare a processing procedure candidate.

In step 222 for code generation, the query analysis program 400 translates the processing procedure candidate into an executable form code. This terminates the processing of the query analysis program 400.

Figure 12:
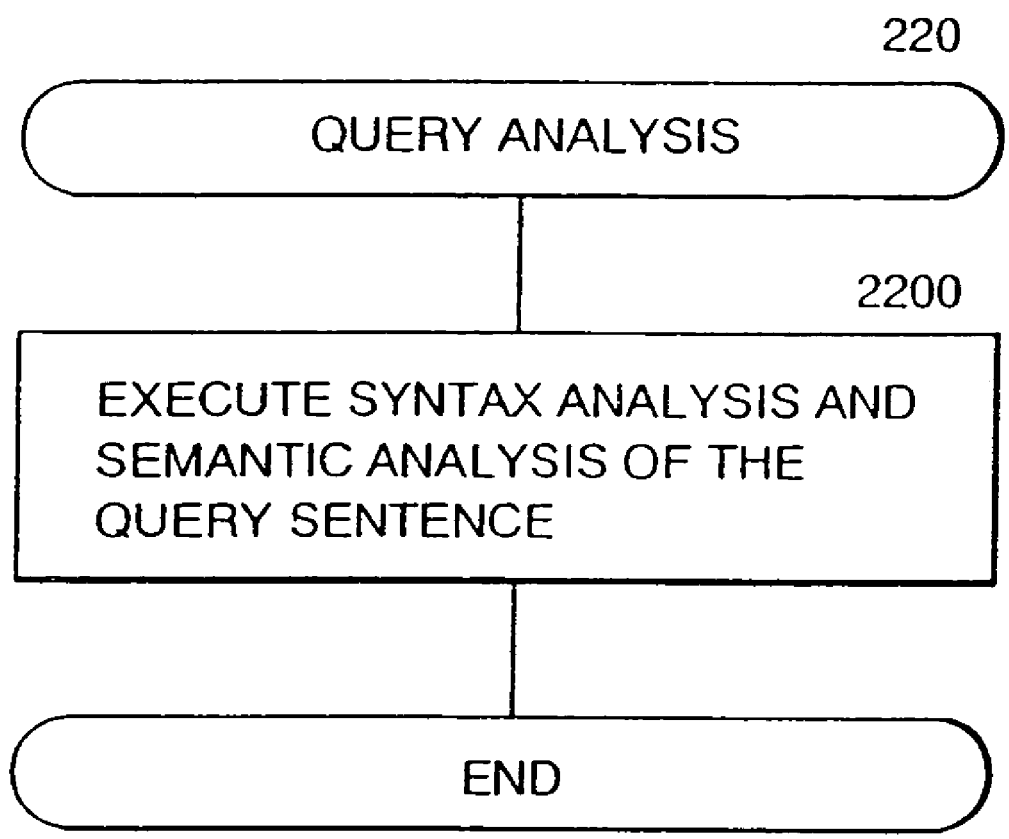
FIG. 12 is a flowchart of steps representing query analysis.

FIG. 12 is a flowchart of steps representing the query analysis 220. In step 2200, the input query sentence is analyzed for syntax and semantics. Then the current processing is terminated.

Figure 13:
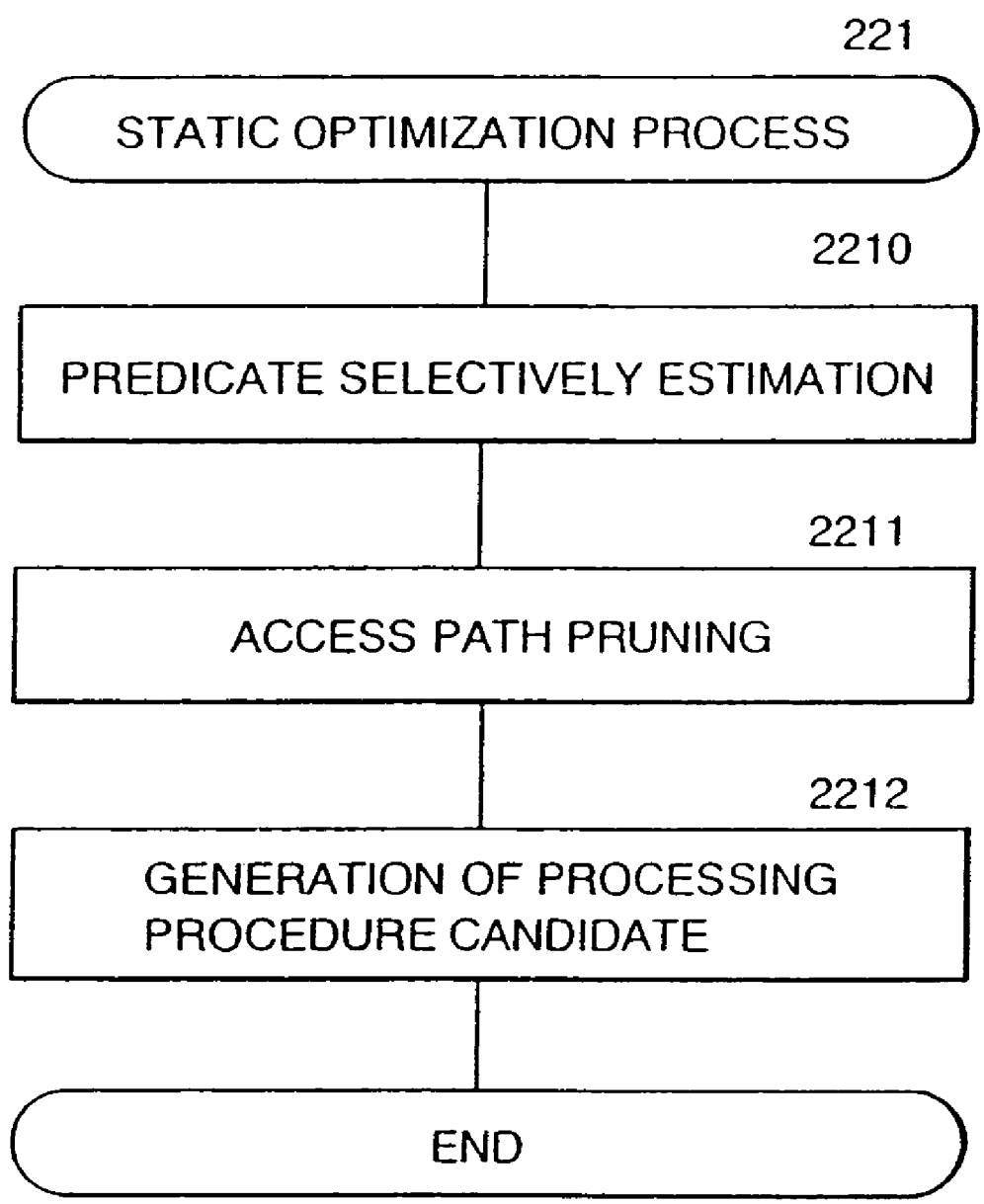
FIG. 13 is a flowchart of steps representing static optimization processing.

FIG. 13 is a flowchart of steps representing the static optimization process 221. In step 2210 for predicate selectivity estimation, the selectivity of the predicate of the condition occurring in the query is estimated.

In step 2211 for access path pruning, the access paths including indices are pruned.

In step 2212 for processing procedure candidate generation, the processing procedure candidate combining the access paths is generated. This terminates the static optimization processing.

Figure 14:
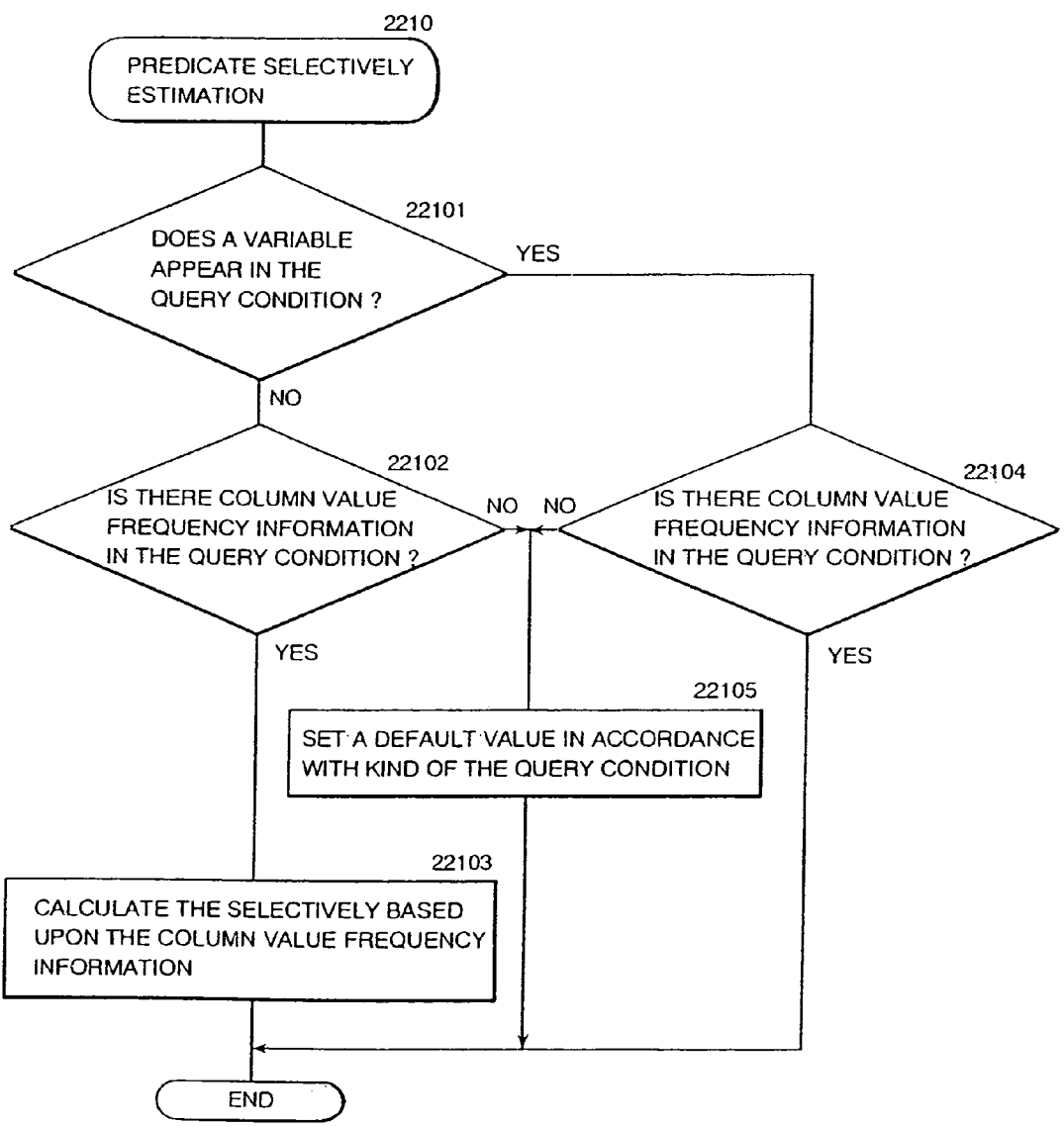
FIG. 14 is a flowchart of steps representing predicate selectivity estimation processing.

FIG. 14 is a flowchart of steps representing the predicate selectivity estimation process 2210. In step 22101, a check is made to see if any variable appears in the query condition. If no variable appears in the query condition, step 22102 is reached. If a variable appears in the query condition, step 22104 is reached.

In step 22102, a check is made to see if the query condition contains column value frequency information. If the column value frequency information is present, step 22103 is reached. If the column value frequency information is not found, step 22105 is reached.

In step 22103, the selectivity is calculated by use of the column value frequency information, and the current processing is terminated.

In step 22104, a check is made to see if the query condition contains column value frequency information. If the column value frequency information is present, the current processing is terminated; if no such information exists, step 22105 is reached.

In step 22105, a default value is set in accordance with the kind of the query condition. The current processing is then terminated.

Figure 15:
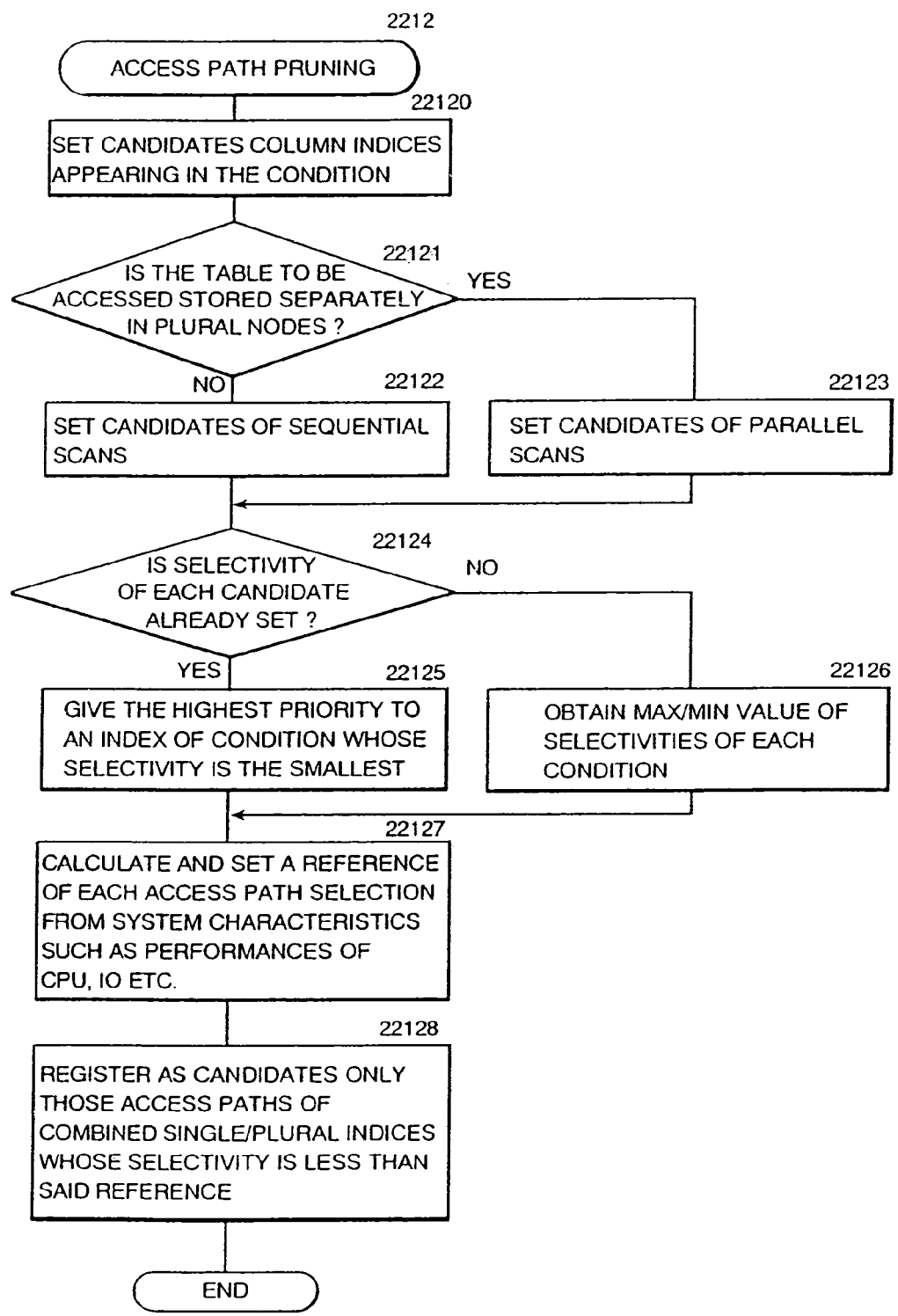
FIG. 15 is a flowchart of steps representing access path pruning.

FIG. 15 is a flowchart of steps representing the access path pruning process 2212. In step 22120, column indices appearing in the condition are set as access path candidates.

In step 22121, a check is made to see if the table to be accessed for the query is stored separately in a plurality of nodes. If the table is not stored separately, step 22122 is reached; if the table is stored separately, step 22123 is reached.

In step 22122, sequential scans are set as access path candidates.

In step 22123, parallel scans are set as access path candidates.

In step 22124, a check is made to see if the selectivity of each condition is already set. If the selectivity is found to be already set, step 22125 is reached; if the selectivity has yet to be set, step 22126 is reached.

In step 22125, the highest access path priority is given to the index of the condition whose selectivity is the smallest regarding each table.

In step 22126, the maximum and minimum values of the selectivity of each condition are obtained.

In step 22127, the reference for selecting each access path is calculated from system characteristics such as the processor performance and I/O performance.

In step 22128, only those access paths of combined single or plural indices whose selectivity is less than the above reference are set as access path candidates.

Figure 16:
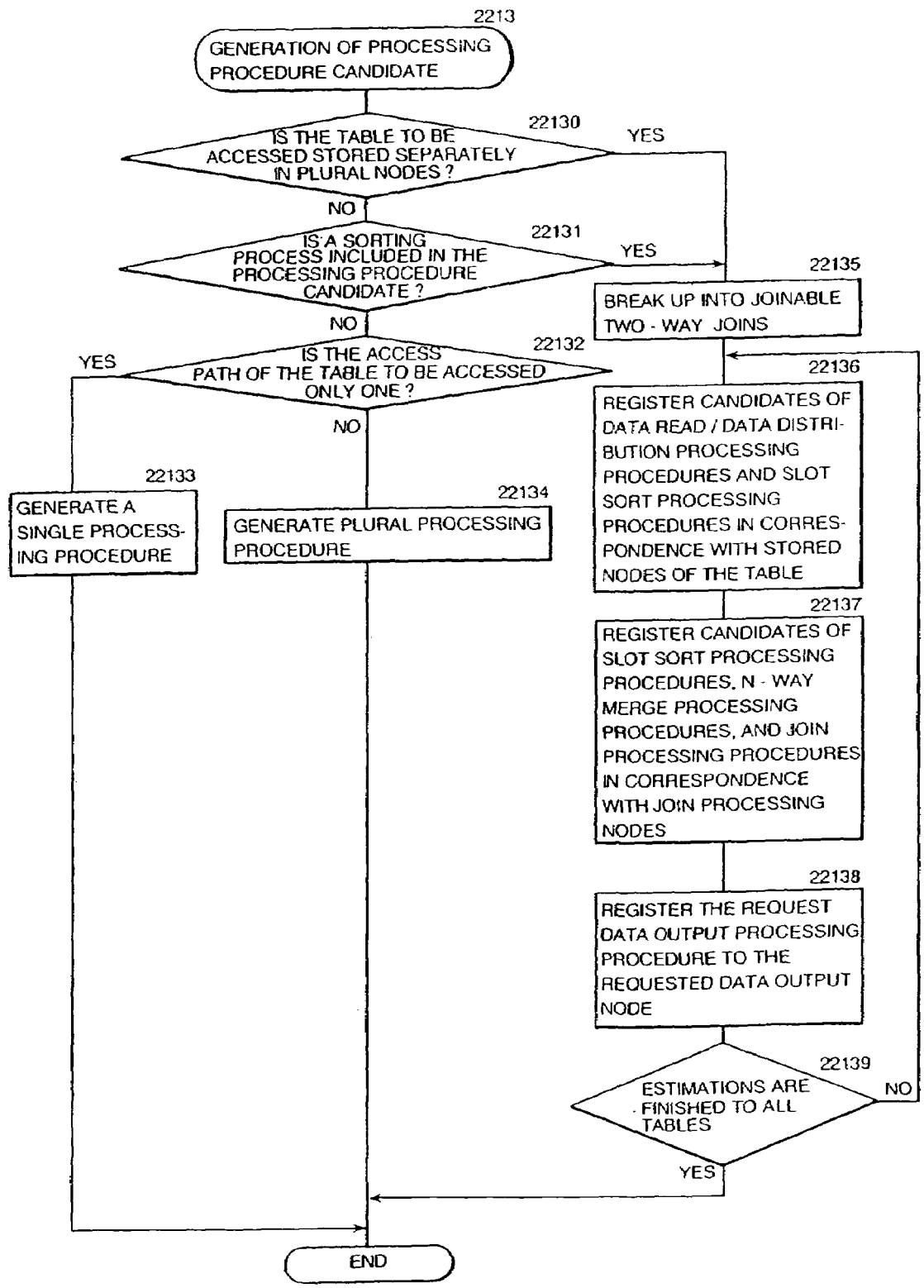
FIG. 16 is a flowchart of steps representing processing procedure candidate generation.

FIG. 16 is a flowchart of steps representing the processing procedure candidate generation process 2213. In step 22130, a check is made to see if the table to be accessed for the query is stored separately in a plurality of nodes. If the table is not stored separately, step 22131 is reached; if the table is stored separately, step 22135 is reached.

In step 22131, a check is made to see if a sorting process is included in the processing procedure candidate. If the sorting process is not included, step 22132 is reached; if the sorting process is included, step 22135 is reached.

In step 22132, a check is made to see if there is only one access path of the table to be accessed. If only one access path exists, step 22133 is reached; if more than one access path is present, step 22134 is reached.

In step 22133, a single processing candidate is generated, and the current processing is terminated.

In step 22134, a plurality of processing candidates are generated, and the current processing is terminated.

In step 22135, the query is broken up into joinable two-way joins.

In step 22136, data read/data distribution processing procedures and slot sort processing procedures are set as candidates in correspondence with the stored nodes of the table stored separately.

In step 22137, slot sort processing procedures, N-way merge processing procedures and join processing procedures are set as candidates in correspondence with the join processing nodes. The slot sort processing refers to an intra-page sorting process in which the page for accommodating data has each of its rows managed by a slot that is offset from the beginning of the page. When the slots are read consecutively, the corresponding rows are accessed in ascending order. The N-way merge processing refers to a process in which an N-way buffer is used to input N runs at each merge stage for sorting by tournament into a single sort run.

In step 22138, a requested data output processing procedure is set to the request data output node.

In step 22139, a check is made to see if estimations are finished on all tables. If not all estimations are finished, step 22136 is reached again; if all estimations are found to be finished, the current processing is terminated.

Figure 17:
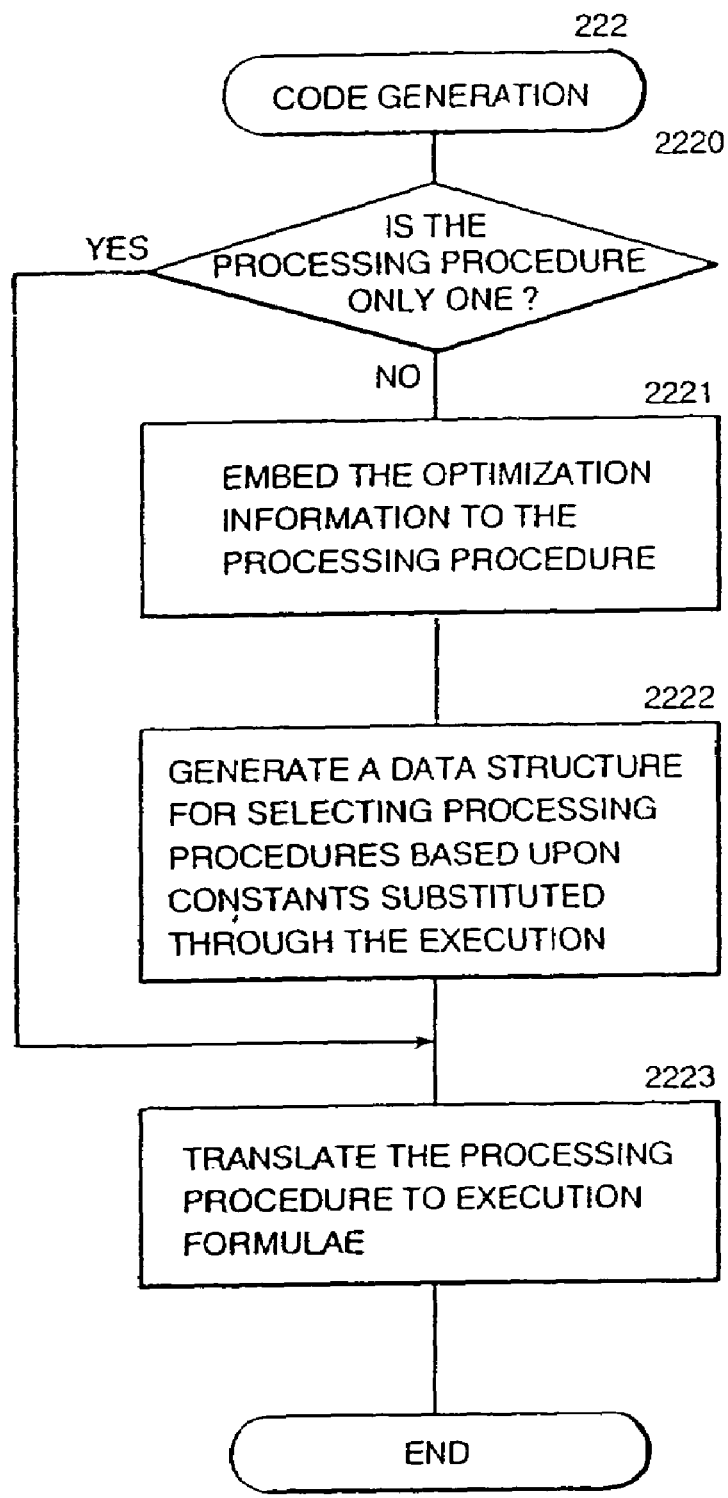
FIG. 17 is a flowchart of steps representing code generation processing.

FIG. 17 is a flowchart of steps carried out by the code generator 222. In step 2220, a check is made to see if there is only one processing procedure candidate. If more than one processing procedure candidate is found, step 2221 is reached; if there exists only one processing procedure candidate, step 2223 is reached.

In step 2221, optimization information composed of column value frequency information and others is embedded into the processing procedures.

In step 2222, the data structure for selecting processing procedures is generated on the basis of the constants substituted upon query execution.

In step 2223, the processing procedure is translated into execution formulae. The processing is then terminated.

Figure 18:
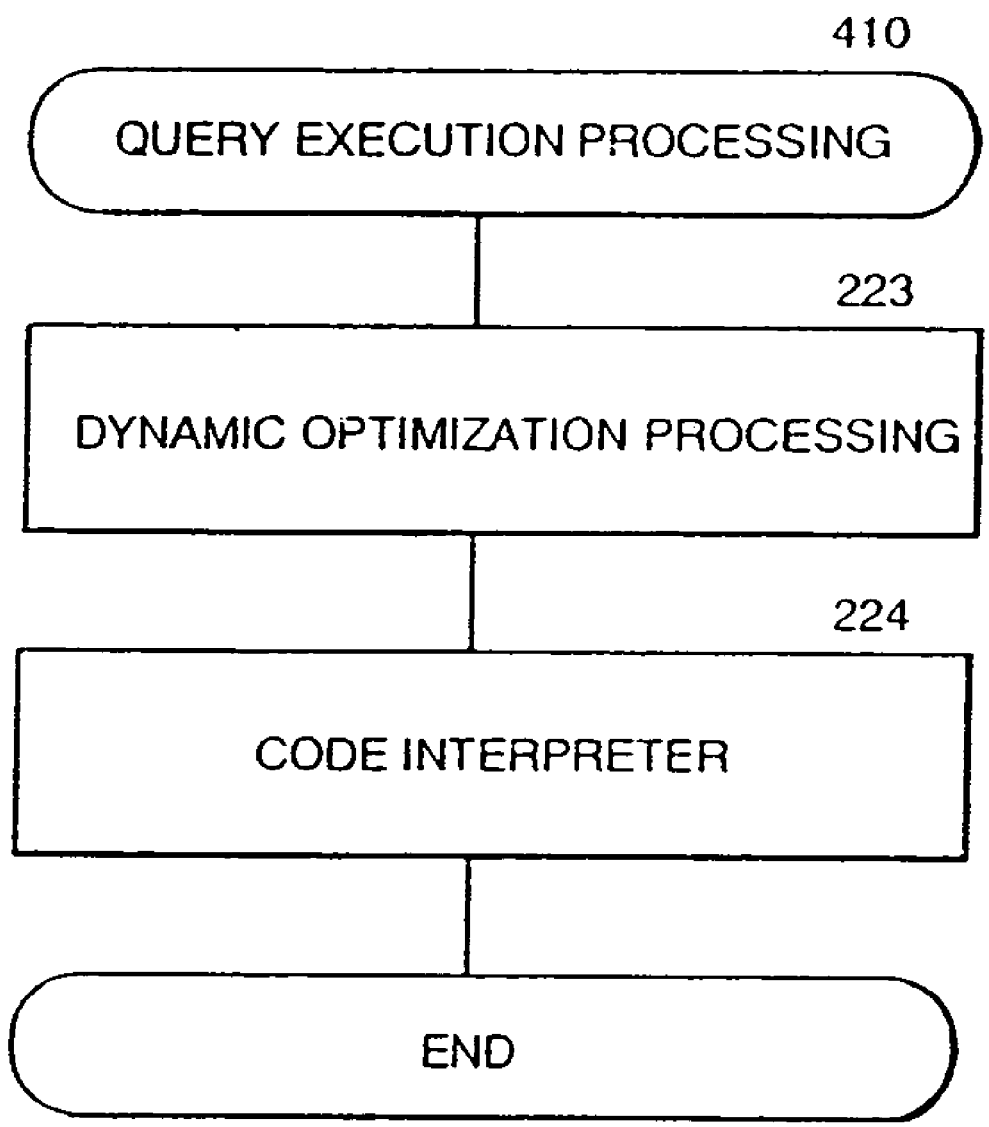
FIG. 18 is a flowchart of steps representing query execution processing.

FIG. 18 is a flowchart of steps performed by the query execution program 410. In step 223 for dynamic optimization processing, the processing procedure to be executed on each node group is determined on the basis of the substituted constants.

In step 224 for code interpretation, the processing procedure is interpreted and executed. The current processing is then terminated.

Figure 19:
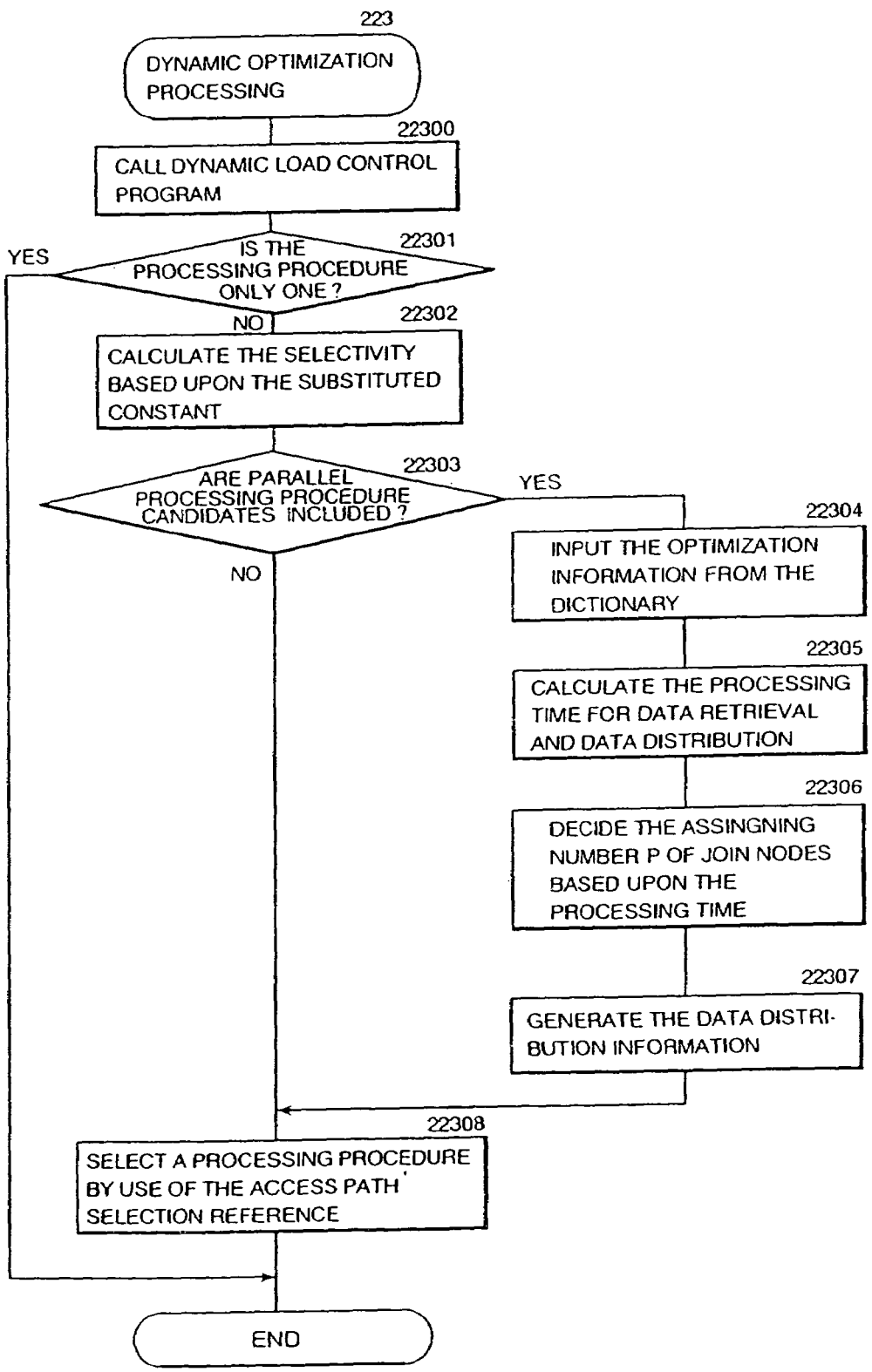
FIG. 19 is a flowchart of steps representing dynamic optimization processing.

FIG. 19 is a flowchart of steps performed by the dynamic optimization processing program 223. In step 22300, a dynamic load control program is called and executed.

In step 22301, a check is made to see if there is only one processing procedure being generated. If there is only one processing procedure being generated, the current processing is terminated. If there is more than one processing procedure being generated, step 22302 is reached.

In step 22302, the selectivity is calculated on the basis of the substituted constants.

In step 22303, a check is made to see if parallel processing procedure candidates are included in the processing procedure candidates. If parallel processing procedure candidates are found to be included, step 22304 is reached; if no such candidates are found, step 22308 is reached.

In step 22304, the optimization information (column value frequency information of join columns, number of rows in the table to be accessed, page count, etc.) is input from the dictionary.

In step 22305, the processing time for data retrieval and data distribution is calculated in consideration of various system characteristics.

In step 22306, the assigning number p of join nodes is determined based on the processing time.

In step 22307, data distribution information is generated on the basis of the optimization information.

In step 22308, the processing procedure is selected by use of the access path selection reference.

Figure 20:
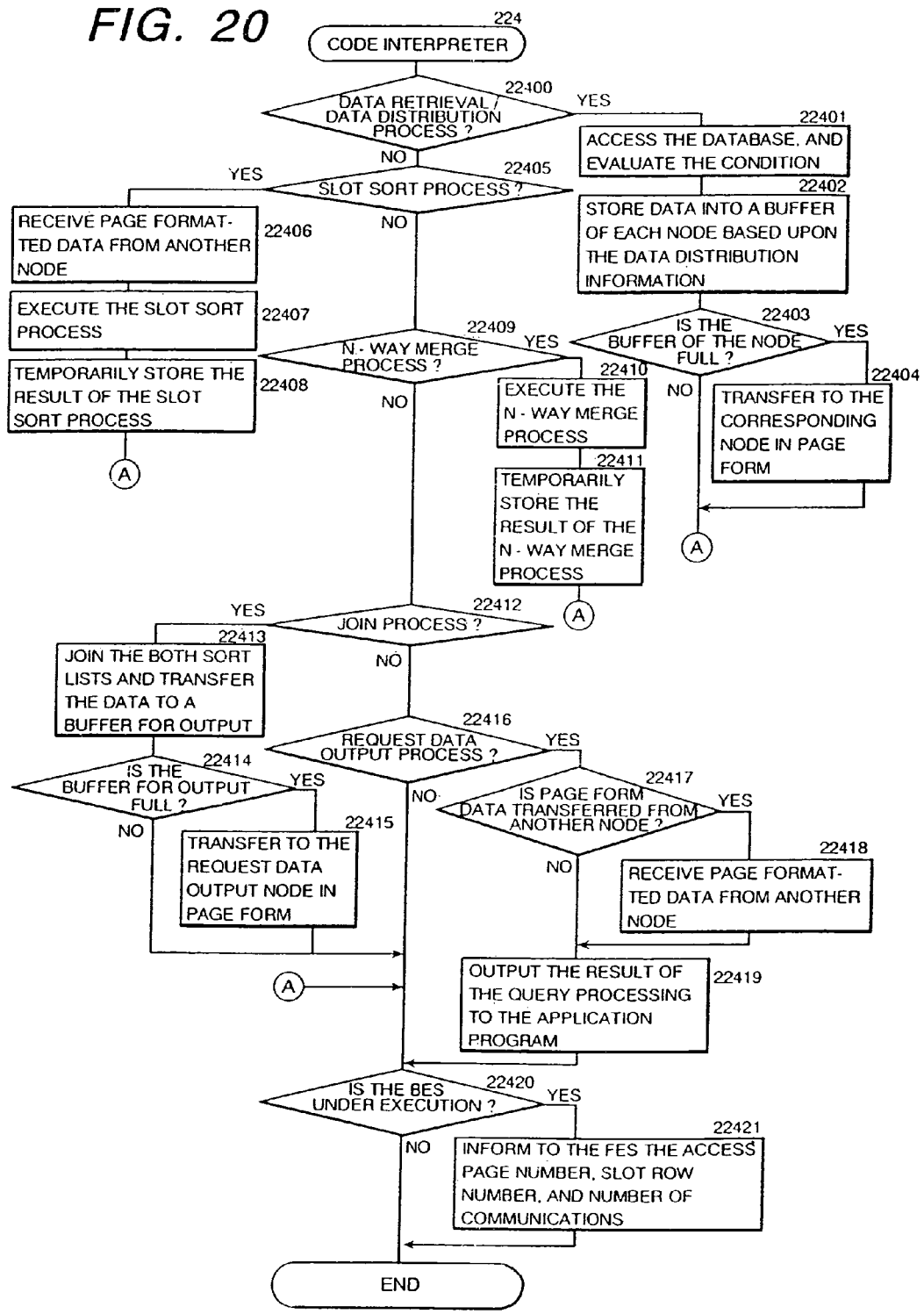
FIG. 20 is a flowchart of steps representing code interpretation processing.

FIG. 20 is a flowchart of steps carried out by the code interpreter 224. In step 22400, a check is made to see if data retrieval and a data distribution process are in effect. If data retrieval and the data distribution process are found to be in effect, step 22401 is reached. If data retrieval and the data distribution process are not found to be in effect, step 22405 is reached.

In step 22401, the database is accessed and the condition is evaluated.

In step 22402, data is set into a buffer of each node based on the data distribution information.

In step 22403, a check is made to see if the buffer of the node in question is full. If the buffer is found to be full, step 22404 is reached; if the buffer is not full, step 22420 is reached.

In step 22404, data is transferred in page form to the corresponding node. Step 22404 is followed by step 22420.

In step 22405, a check is made to see if a slot sort process is in effect. If the slot sort process is found to be in effect, step 22406 is reached; if the slot sort process is not found to be in effect, step 22409 is reached.

In step 22406, page form data is received from another node.

In step 22407, the slot sort process is executed.

In step 22408, the result of the slot sort process is stored temporarily. Step 22408 is followed by step 22420.

In step 22409, a check is made to see if an N-way merge process is in effect. If the N-way merge process is found to be in effect, step 22410 is reached; if the N-way merge process is not found to be in effect, step 22412 is reached.

In step 22410, the N-way merge process is executed.

In step 22411, the result of the N-way merge process is stored temporarily. Step 22411 is followed by step 22420.

In step 22412, a check is made to see if a join process is in effect. If the join process is found to be in effect, step 22413 is reached; if the join process is not found to be in effect, step 22416 is reached.

In step 22413, both sort lists are joined and data is set to a buffer for output.

In step 22414, a check is made to see if the buffer for output is full. If the buffer for output is found to be full, step 22415 is reached; if the buffer for output is not found to be full, step 22420 is reached.

In step 22415, data is transferred in page form to the request data output node. Step 22415 is followed by step 22420.

In step 22416, a check is made to see if a request data output process is in effect. If the request data output process is found to be in effect, step 22417 is reached. If the request data output process is not found to be in effect, step 22420 is reached.

In step 22417, a check is made to see if page form data is transferred from another node. If page form data is found to be transferred from another node, step 22418 is reached; if no such data is found to be transferred, step 22419 is reached.

In step 22418, page form data is received from another node.

In step 22419, the result of the query processing is output to the application program.

In step 22420, a check is made to see if the BES node is in execution. If the BES node is found to be in execution, step 22421 is reached; if the BES node is not in execution, the current processing is terminated.

In step 22421, the FES is notified of that information for estimating processing load which includes the access page count, the hit row count and the number of communications. The current processing is then terminated.

Figure 21:
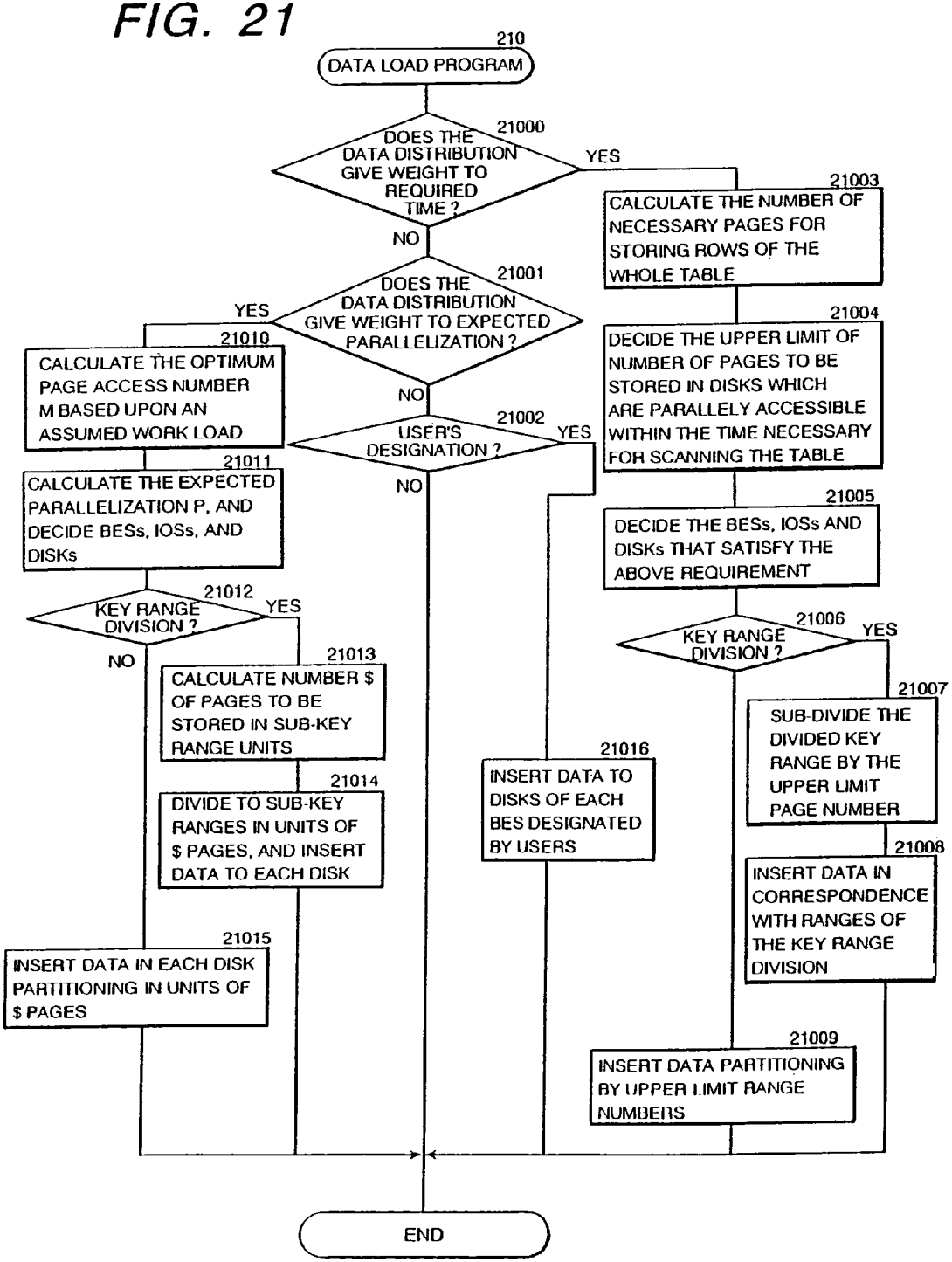
FIG. 21 is a flowchart of steps representing data load processing.

FIG. 21 is a flowchart of steps performed by the data load program 210. Before each step of the data load process is explained, general concepts of the process will be outlined below. The data load method comes in three kinds: one method distributes data with the emphasis on a target response time, whereby the time required to scan the entire table is limited below a predetermined level; another method distributes data with the emphasis on degrees of parallelism, whereby m pages are accessed for optimal parallel processing; yet another method distributes data as desired under user control, whereby all volume partitions are designated by the user.

The distribution of data with the emphasis on the target response time involves initially finding the number of pages in which to store the rows of the entire table. Then the upper limit number of pages to be stored in the disk units partitioned for parallel access is determined. If necessary, batch input (e.g., of 10 pages) is presupposed for access. Load distribution is determined in view of the combination of the number of disk units, the number of IOS nodes and the number of BES nodes. If there exists a key range division, the divided key range is subdivided by the upper limit page count and data is stored into the subdivided key ranges of the disk units. More aspects of this process will be described later in detail with reference to FIG. 23.

The distribution of data with the emphasis on degrees of parallelism is dependent on the size m which is preferred to be considerably large. If there is a key range division, the number of sub-key range-storing pages s for the divided key range is determined on the basis of the size m and of the expected degree of parallelism p ($=m/p$). Data is stored in units of s pages into the subdivided key ranges of the disk units.

The expected degree of parallelism p is calculated as the square root of the ratio given by dividing the response time by the overhead per node. When so obtained, the ratio of 10 corresponds to the expected degree of parallelism of 3, 100 to 10, 1,000 to 32, and 10,000 to 100. If the calculated degree of parallelism p is higher than the existing partition count, the existing partition count is selected (because it determines the maximum number of disk units that may be processed). Conversely, if the calculated expected degree of parallelism p is lower than the existing partition count, the expected degree of parallelism p is selected with the existing partition count taken as the upper limit.

Specifically, suppose that the distribution of data optimized for 100-page access is to be calculated. As a precondition, batch input is to be carried out in units of 10 pages. Because it takes 300 msec to perform one I/O operation (i.e., 10-page access) and 5.6 msec to carry out one I/O overhead operation (56 ks required for 10-MIPS performance), the expected degree of parallelism p is about 7 ($=\sqrt{\{300/5.6\}}$). Thus the key range is subdivided into sub-key ranges in units of 14 pages ($s=100/7$).

The user-designated distribution of data is effected in the same manner as with conventional database management systems. That is, data distribution is managed as set by parameters.

In step 21000 of FIG. 21, a check is made to see if data distribution puts the emphasis on the target response time. If the emphasis is not found to be placed on the target response time, step 21001 is reached. If the emphasis is found to be placed on the target response time, step 21003 is reached.

In step 21001, a check is made to see if data distribution puts the emphasis on the expected degree of parallelism. If the emphasis is not found to be placed on the expected degree of parallelism, step 21002 is reached. If the emphasis is found to be placed on the expected degree of parallelism, step 21010 is reached.

In step 21002, a check is made to see if a user's designation exists. If the user's designation is found, step 21016 is reached. If the user's designation is not found, the current processing is terminated.

In step 21003, the number of necessary pages for storing the rows of the whole table is calculated.

Step 21004 decides the upper limit number of pages to be stored into disk units which are parallelly accessible within a predetermined time that is needed to scan the whole table.

In step 21005, the BES nodes, IOS nodes and disk units which satisfy the preceding requirement are determined.

In step 21006, a check is made to see if there is a key range division. If there exists a key range division, step 21007 is reached. If there is no key range division, step 21009 is reached.

In step 21007, the divided key range is subdivided by an upper limit page count.

In step 21008, data is inserted into the key range subdivisions. Thereafter, the current processing is terminated.

In step 21009, data is inserted as partitioned by the upper limit page count. Then the current processing is terminated.

In step 21010, the optimum page access count m is calculated on the basis of the estimated work load.

In step 21011, the expected degree of parallelism p is calculated, and the BES node, IOS node and disk units are determined accordingly.

In step 21012, a check is made to see if there exists a key range division. If there is a key range division, step 21013 is reached. If there is no key range division, step 21015 is reached.

In step 21013, the number of pages s to be stored in sub-key range units is calculated ($s=m/p$).

In step 21014, pages are divided in units of s pages into the sub-key ranges and data is inserted into each of the disk units. Then the current processing is terminated.

In step 21015, data is inserted as partitioned in units of s pages to each disk unit.

In step 21016, data is inserted to the disk units managed by the user-designated IOS node. The current processing is then terminated.

Figure 22:
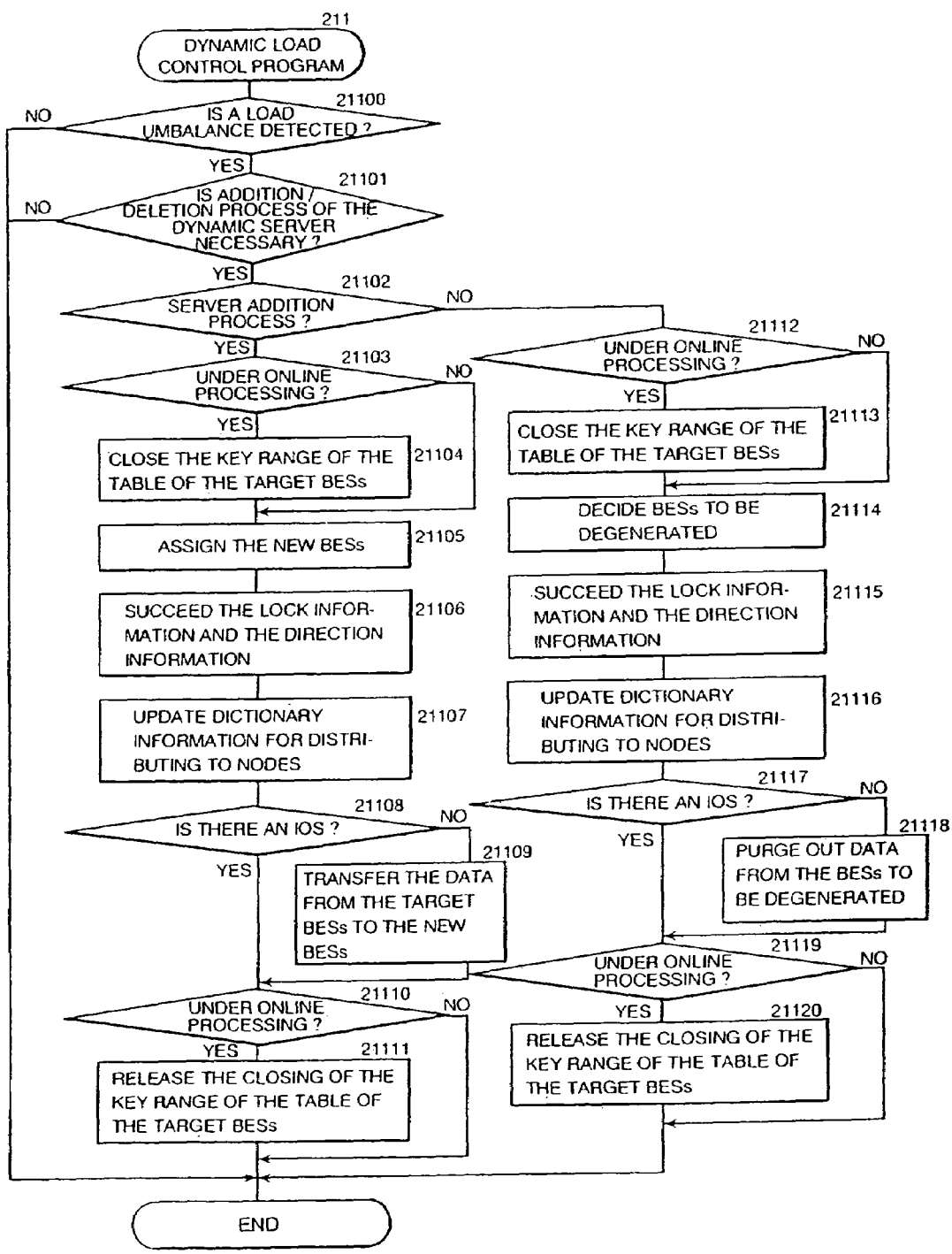
FIG. 22 is a flowchart of steps representing dynamic load control processing.

FIG. 22 is a flowchart of steps performed by the dynamic load control program 211. In step 21100, a check is made to see if there is a load unbalance (access concentrated or discrete). Specifically, the congested resources (processors (BES, IOS), disk units) are detected from the database processing load executed in the unit time per node (i.e., the load is composed of the number of processing steps (for DB processing, I/O processing and communication processing), of the processor performance (converted to processing time), and of the I/O operation count (converted to I/O time)). The DB processing is then translated into SQL sentences and the status of access to each resource is sorted in units of tables. If a load unbalance is detected, step 21101 is reached; if no load unbalance is detected, the current processing is terminated.

In step 21101, a check is made based on the access distribution information to see whether it is necessary to add or delete BES nodes, IOS nodes and/or disk unit pairs. If such addition or deletion is necessary, step 21102 is reached; if no such addition or deletion is necessary, the current processing is terminated.

In step 21102, a check is made to see if any more server needs to be added. If such addition is needed, step 21103 is reached; if no such addition is needed, step 21112 is reached.

In step 21103, a check is made to see if online processing is in progress. If online processing is found to be in progress, step 21104 is reached. If online processing is not in effect, step 21105 is reached.

In step 21104, the key range of the table managed by the target BES nodes is closed.

In step 21105, new BES nodes are assigned.

In step 21106, lock information and directory information are succeeded.

In step 21107, the DS 71 is ordered to update the dictionary information necessary for node assignment control.

In step 21108, a check is made to see if an IOS node exists. If no IOS node is found, step 21109 is reached. If an IOS node is found to exist, step 21110 is reached. This step is inserted here so that the same dynamic load control program may address two kinds of system configurations: one wherein the IOS exists and the other in which no IOS exists.

In step 21109, data is transferred from the target BES nodes to the new BES nodes.

In step 21110, a check is made to see if online processing is in progress. If online processing is found to be in progress, step 21111 is reached. If online processing is not in effect, the current processing is terminated.

In step 21111, the closing of the key range of the table managed by the target BES nodes is released. Then the current processing is terminated.

In step 21112, a check is made to see if online processing is in progress. If online processing is found to be in progress, step 21113 is reached. If online processing is not in effect, step 21114 is reached.

In step 21113, the key range of the table managed by the target BES nodes is closed.

In step 21114, the BES nodes to be degenerated are determined.

In step 21115, the lock information and directory information are succeeded.

In step 21116, the DS 71 is ordered to update the dictionary information necessary for node assignment control.

In step 21117, a check is made to see if an IOS node exists. If no IOS node is found, step 21118 is reached. If an IOS node is found to exist, step 21119 is reached.

In step 21118, data is purged out of the BES nodes to be degenerated.

In step 21119, a check is made to see if online processing is in progress. If online processing is found to be in progress, step 21120 is reached. If online processing is not in effect, the current processing is terminated.

In step 21120, the closing of the key range of the table managed by the target BES nodes is released. Then the current processing is terminated.

Figure 23:
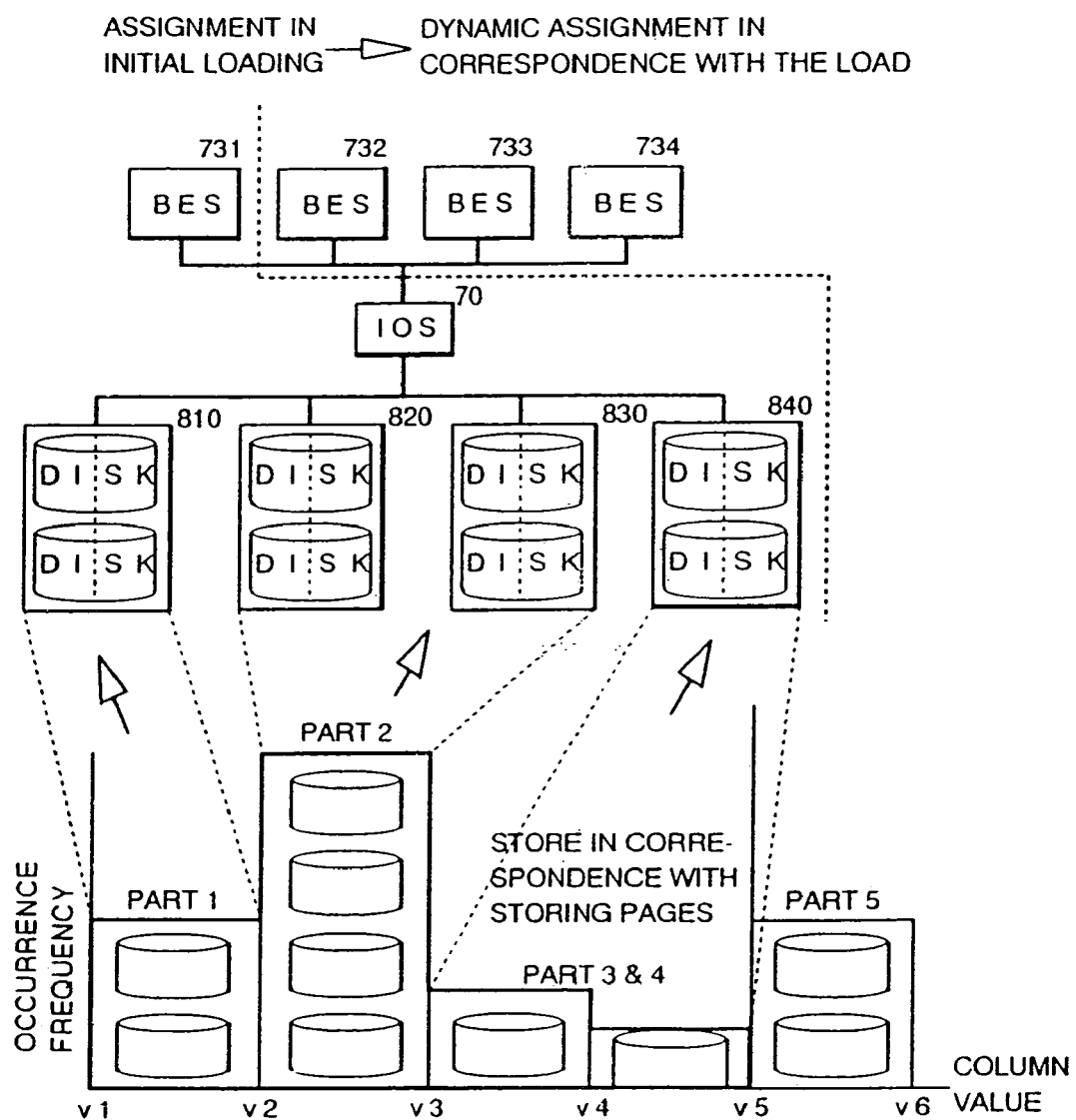
FIG. 23 is a conceptual view of dynamic load control.

FIG. 23 is a conceptual view of dynamic data load control using the key range division scheme. For this setup, it is assumed that the partition count is 4 and that the column values v1-v6 of the database take the occurrence frequencies of FIG. 21.

At initial data load time, only one BES node 731 is needed. The upper limit number of pages to be stored is made to correspond with each of the partitions 810-840 constituted by the disk units. In this setup, the column values v1-v2 are stored in the disk units of the partition 810; the column values v2-v3 are stored in the disk units of the partitions 820-830; the column values v3-v5 are stored in the disk units of the partition 840; and the column values v5-v6 are stored in other disk units. At initial data load time, the directory information is generated for each disk unit so as to manage the pages stored therein.

Where the BES nodes 732-734 are used selectively in accordance with the load, the directory information regarding each disk unit corresponding to the configured BES nodes is utilized for access to the database.

The processes described above may be implemented in other variations of the invention outlined below. In one variation, information about BES positions is not included in row identifiers so as to facilitate the transfer of rows between nodes. A BES node determines the physical position of a given row by combining the row identifier with the directory information for defining the divided positions of the table. Row transfer is accomplished by updating the directory information. There may be provided a structure capable of dealing with node reconfiguration or row transfer, the structure allowing the processing to be partitioned through succession of the directory information and lock information even as BES nodes are added dynamically.

If it is desired to manage the database in a replica setup, the storage area needs to be doubled. This means that the disk access load is approximately doubled whether or not primary and backup copies are managed by the same IOS and BES nodes. Therefore the number of volumes for each partition managed with the exist partition count need only be halved.

In case of a disk unit, IOS or BES failure, the failed unit or node is disconnected from the online processing. The failed unit or node is repaired and then reconnected to the online processing. The way in which the closing of the key range is managed varies with the node. Specifically, in case of a disk unit failure, the key range stored in that disk unit is closed. If a backup copy exists (the backup copy needs to be acquired under management of the same IOS node (mirror disk unit) or of another IOS node (data replica)), the processing is reassigned. In case of an IOS node failure, the key range stored in that IOS node is closed. If a backup copy exists (the backup copy needs to be acquired under management of another IOS node (data replica)), the processing is reassigned. In case of a BES node failure, the key range managed by that BES node is closed. If an IOS node exists, new BES nodes are assigned, lock information is succeeded, the dictionary information necessary for node assignment control is updated, and the processing is allowed to continue.

This invention is not limited to systems wherein rules based on statistical information and cost evaluations are used in combination. The invention may also be applied to database management systems performing optimization processing by use of cost evaluations alone, the rules alone, or the combination of cost evaluations and the rules, as long as processing procedures offering appropriate database reference characteristic information can be acquired thereby.

This invention may be practiced via a software system for a tightly or loosely coupled composite processor system in a mainframe computer. It is also possible to practice the invention via a tightly or loosely coupled composite processor system using a dedicated processor for each of the component processing programs. The invention may also be applied to a single processor system if the system assigns parallel processes to each processing procedure.

Furthermore, the invention may be applied to configurations wherein a plurality of processors share each of a plurality of disk units.

The database divisional management method of the invention renders the system configuration suitable for the load in question. This provides the desired degree of parallelism and permits high-speed query processing.

The parallel database system according to the invention is thus a scalable parallel database system capable of altering the system configuration constantly in keeping with any fluctuation in load.

As many apparently different embodiments of this invention may be made without departing from the spirit and scope thereof, it is to be understood that the invention is not limited to the specific embodiments thereof except as defined in the appended claims.

What is claimed is:

1. A data processing method for accessing a database data based on query inputs and processing data from the database in data processing system having storage devices that includes a plurality of data storage areas to configure the databases to store data therein, the method comprising:
    storing correspondence of a plurality of key ranges previously determined to a plurality of the data storage areas in the storage device;
    storing the data in the data storage area corresponding to the key range contained the data therein when the data is stored in the database;
    making correspondence information about the key range to the data storage area according to an acceptance of a request including the information about the key range to add and information about the data storage areas;
    copying data corresponding to the information about the key range to add stored in the other data storage area from said other data storage area to the data storage area corresponding to the information of said key range;
    analyzing a database calculation request according to the query inputs of the database calculation request;
    obtaining the information about the key range corresponding to the database calculation request; and
    accessing the data storage area corresponding to the information of the key range to refer to the data stored in the data storage area accessed and to process the database calculation request.

2. The data processing method according to claim 1, further comprising the step of:
    purging data corresponding to the information about the key range to add from said other data storage area.

3. The data processing method according to claim 1, further comprising the step of:
    transferring data corresponding to the information about the key range to add stored in the other data storage area from said other data storage area to the data storage area corresponding to the information of said key range.

* * * * *

UNITED STATES PATENT AND TRADEMARK OFFICE
CERTIFICATE OF CORRECTION

| | |
|---|---|
| PATENT NO. | : 7,599,910 B1 |
| APPLICATION NO. | : 09/665448 |
| DATED | : October 6, 2009 |
| INVENTOR(S) | : M. Tsuchida et al. |

It is certified that error appears in the above-identified patent and that said Letters Patent is hereby corrected as shown below:

On the title page, Related U.S. Application Data

Item (60), insert: -- Continuation of application No. 09/429,398, filed on Oct. 28, 1999, now Pat. No. 6,192,359, which is a continuation of application No. 09/153,612, filed Sep. 15, 1998, now U.S. Pat. No. 6,101,495, which is a continuation of application No. 08/341,953, filed on Nov. 16, 1994, now U.S. Patent No. 5,813,005. --

Signed and Sealed this

Twenty-second Day of December, 2009

David J. Kappos
*Director of the United States Patent and Trademark Office*